(12) United States Patent
Copley et al.

(10) Patent No.: US 11,563,779 B2
(45) Date of Patent: *Jan. 24, 2023

(54) MULTIUSER ASYMMETRIC IMMERSIVE TELECONFERENCING

(71) Applicant: Avatour Technologies, Inc., Dover, DE (US)

(72) Inventors: Devon Copley, San Francisco, CA (US); Prasad Balasubramanian, Fremont, CA (US)

(73) Assignee: Avatour Technologies, Inc., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/577,868

(22) Filed: Jan. 18, 2022

(65) Prior Publication Data

US 2022/0141259 A1 May 5, 2022

Related U.S. Application Data

(63) Continuation of application No. 16/840,780, filed on Apr. 6, 2020, now Pat. No. 11,228,622.

(Continued)

(51) Int. Cl.
*H04L 65/1066* (2022.01)
*H04N 7/15* (2006.01)

(52) U.S. Cl.
CPC ............ *H04L 65/1066* (2013.01); *H04N 7/15* (2013.01)

(58) Field of Classification Search
CPC ............ H04N 7/14; H04N 7/15; H04N 7/157; H04M 1/72519; H04M 3/56; H04M 2207/18; H04M 2250/62

(Continued)

(56) References Cited

U.S. PATENT DOCUMENTS 8,413,218 B1 4/2013 Hopkins et al.
8,854,282 B1 10/2014 Wong
(Continued)

FOREIGN PATENT DOCUMENTS

EP 2894852 A1 7/2015

OTHER PUBLICATIONS

Cricri, Francesco, et al., "Multimodal Semantics Extraction from User-Generated Videos," Hindawi Publishing Corporation, vol. 2012, Article ID 292064, 18 pages.
(Continued)

*Primary Examiner* — Maria El-Zoobi
(74) *Attorney, Agent, or Firm* — Vierra Magen Marcus LLP

(57) ABSTRACT

Embodiments described herein enable a teleconference among host-side user(s) at a host site and remotely located client-side user(s), wherein a host device is located at the host site, and wherein each of the client-side user(s) uses a respective client device to participate in the teleconference. A host site audio-visual feed is received from the host device. A client data feed is received from the client device of each client-side user. Orientation information for the respective client-side user using a client device is also received. Each client device is provided with the host site audio-visual feed or a modified version thereof. The host device is provided with, for each client device, the client data feed and the orientation information of the client-side user that is using the client device. This enables host-side and client-side users to display visual representations of one another with their respective orientations.

20 Claims, 10 Drawing Sheets

Related U.S. Application Data

(60) Provisional application No. 62/830,647, filed on Apr. 8, 2019.

(58) Field of Classification Search
USPC .............................. 348/14.02–14.9; 455/416
See application file for complete search history.

(56) References Cited

U.S. PATENT DOCUMENTS

| | | |
|---|---|---|
| 2013/0249947 A1 | 9/2013 | Reitan |
| 2015/0195489 A1* | 7/2015 | Sobti ...................... H04N 7/142 348/14.08 |
| 2015/0138193 A1 | 12/2015 | Cunico et al. |
| 2016/0026253 A1 | 1/2016 | Bradski et al. |
| 2016/0275952 A1* | 9/2016 | Kashtan ................ H04M 3/569 |
| 2017/0068508 A1 | 3/2017 | Cricri et al. |
| 2017/0206707 A1 | 7/2017 | Guay et al. |
| 2019/0230310 A1 | 7/2019 | Faulkner |
| 2020/0322395 A1 | 10/2020 | Copley et al. |
| 2021/0073549 A1 | 3/2021 | Desai et al. |

OTHER PUBLICATIONS

International Search Report & The Written Opinion of the International Searching Authority dated Sep. 8, 2020, International Application No. PCT/US2020/027037.
Non-Final Office Action dated Feb. 8, 2021, U.S. Appl. No. 16/840,780, filed Apr. 6, 2020.
Response to Office Action dated Jul. 23, 2021, U.S. Appl. No. 16/840,780, filed Apr. 6, 2020.
Final Office Action dated Aug. 16, 2021, U.S. Appl. No. 16/840,780, filed Apr. 6, 2020.
Notice of Allowance dated Sep. 9, 2021, U.S. Appl. No. 16/840,780, filed Apr. 6, 2020.
U.S. Appl. No. 17/577,875, filed Jan. 18, 2022.
Non-Final Office Action dated Oct. 13, 2022, U.S. Appl. No. 17/577,875, filed Jan. 18, 2022.

* cited by examiner

MULTIUSER ASYMMETRIC IMMERSIVE TELECONFERENCING

PRIORITY CLAIM

This application is a continuation of U.S. patent application Ser. No. 16/840,780, filed Apr. 6, 2020, issued as U.S. Pat. No. 11,228,622, which claims priority to U.S. Provisional Patent Application No. 62/830,647, filed Apr. 8, 2019. Priority is claimed to each of the above listed Applications, each of which is incorporated herein by reference.

TECHNOLOGICAL FIELD

Embodiments of the present technology generally relate to teleconferencing, and particular embodiments relate to teleconferencing that incorporates virtual reality (VR), augmented reality (AR), and/or telepresence.

BACKGROUND

Various different types of technology exist for allowing people that are located at different physical locations to communicate with one another. Such technology is generally referred to a teleconferencing. Where people can communicate with one another both visually and auditorily, such technology is typically referred to as videoconferencing, which can be considered a specific type of teleconferencing. Videoconferencing enables two or more people (also referred to as participants) at different locations to participate in a conference using a data network to transmit audio and video data between computing devices that are proximate to the participants. Telepresence, which is a subset of teleconferencing, refers to a set of technologies which allow a person to feel as if they are present, to give the appearance of being present, or to have an effect (e.g., via telerobotics) at a place other than their true location. Technology also exists for enabling people to communicate with one another in virtual environments, e.g., by rendering of "avatars" within those environments, and enabling communication among avatars. Further, technology exists for obtaining and displaying 360° video and other wide-field-of-view ("wide-FOV") video to enable a real-world environment to be experienced by remote viewers wearing virtual reality (VR) or augmented reality (AR) head-mounted displays (HMDs).

BRIEF SUMMARY

Certain embodiments of the present technology relate to methods and systems for enabling teleconference among one or more host-side users located at a host site and one or more client-side users that are remotely located relative to the host site, wherein a host device is located at the host site, and wherein each of the one or more client-side users uses a respective client device to participate in the teleconference. Other embodiments relate to one or more processor readable storage devices having instructions encoded thereon which when executed cause one or more processors to perform a method for enabling a teleconference.

In accordance with certain embodiments, a method includes receiving from the host device a host site audio-visual feed that includes audio and video of the host site. The method also includes receiving from each of one or more client devices, being used by a respective one of the one or more client-side users, a client data feed that includes audio data for the client-side user and visual representation data for the client-side user, wherein the visual representation data corresponds to real-world images of the client-side user, real-world video of the client-side user, or motion data (including head, hand, and/or body motion data) sufficient to animate an avatar representing the client-side user. The method also includes receiving from each client device, of the one or more client devices, orientation information for the respective client-side user that is using the client device. Additionally, the method includes providing to each client device, of the one or more client devices, the host site audio-visual feed or a modified version thereof, which includes video and audio data of the host site, to thereby enable each client device to output video and audio of the host site for consumption by a respective client-side user that is using the client device. Further, the method includes providing to the host device, for each client device of the one or more client devices, the client data feed and the orientation information of the client-side user that is using the client device, to thereby enable the host device to display, to the one or more host-side users located at the host site, a visual representation of each of the one or more client-side users with their respective orientation, wherein the visual representation of each client-side user, of the one or more client-side users, comprises one or more real-word images of the client-side user, real-world video of the client-side user, or an avatar representing the client-side user.

In accordance with certain embodiments, the one or more client-side users comprises a plurality of client-side users, each of which uses a respective client device of a plurality of client devices to participate in the teleconference. For a first client-side user of the plurality of client-side users, the visual representation data, which is received from the client device of the first client-side user, corresponds to motion data sufficient to animate an avatar representing the first client-side user. In a certain such embodiment, the client data feed and the orientation information for the first client-side user, which is provided to the host device, enables the host device to display the avatar representing the first client-side user in a manner that indicates an orientation with which the first client-side user is consuming video of the host site using the client device of the first client-side user.

In accordance with certain embodiments, for a second client-side user of the plurality of client-side users, the visual representation data, which is received from the client device of the second client-side user, corresponds to real-world video of the second client-side user. In a certain such embodiment, the client data feed and the orientation information of the second client-side user, which is provided to the host device, enables the host device to display the real-world video of the second client-side user in a manner that indicates an orientation with which the second client-side user is consuming video of the host site using the client device of the second client-side user.

In accordance with certain embodiments, where the one or more client-side users comprise a plurality of client-side users, each of which uses a respective client device of a plurality of client devices to participate in the teleconference, a respective client data feed and respective orientation information is received from each of the plurality of client devices for a respective one of the plurality of client-side users. In a certain such embodiment, the method further comprises providing to each client device, of the plurality of client devices being used by the plurality of client-side users, one or more client data feeds and respective orientation information that enables the client device to display a visual representation of one or more other ones of the client-side users at one or more respective virtual locations at the host site.

In accordance with certain embodiments, a first client data feed and respective orientation information for a first client-side user of the plurality of client-side users, and a second client data feed and respective orientation information for a second client-side user of the plurality of client-side users, are both provided to a third client-side user of the plurality of client-side users. The first client data feed includes visual representation data that corresponds to motion data sufficient to animate an avatar representing the first client-side user on the client device of the third client-side user in a manner that indicates an orientation with which the first client-side user is consuming video of the host site using the client device of the first client-side user. The second client data feed corresponds to real-world video of the second client-side user that enables real-world video of the second client-side user to be displayed on the client device of the third client-side user in a manner that indicates an orientation with which the second client-side user is consuming video of the host site using the client device of the second client-side user. In accordance with certain embodiments, the first and second client data feeds that are provided to the client device of the third client-side user enable the avatar representing the first client-side and the real-world video of the second client-side user to be simultaneously displayed on the client device of the third client-side user, such that the avatar representing the first client-side and the real-world video of the second client-side user appear as if they are located at the host site. The orientation information corresponding to the first client data feed is used to control where the avatar representing the first client-side appears to be looking. The orientation information corresponding to the second client data feed is used to control where the real-world video of the second client-side user appears to be looking.

In accordance with certain embodiments, a method also includes the host device determining or otherwise obtaining, for each client-side user of the one or more client-side users, virtual location information for the client-side user. In a certain such embodiment, when the host device displays, to the one or more host-side users located at the host site, the visual representation of each client-side user of the one or more client-side users, the visual representation of the client-side user is displayed at their respective virtual location. In a certain such embodiment, the host device determines the virtual location information of a client-side user of the one or more client-side users by assigning the client-side user their respective virtual location. Alternatively, a client device determines, and provides to the host device, the virtual location information for the client-side user that is using the client device.

In accordance with certain embodiments, a method also includes changing where the visual representation of one of the one or more client-side users is displayed in response to the virtual location of the one of the one or more client-side users changing.

In accordance with certain embodiments, at least a video portion of the host site audio-visual feed is obtained by a wide-field-of-view (wide-FOV) camera (e.g., 360-degree camera) of the host device that produces wide-FOV video, and different portions of the host site can be viewed by each client-side user, of the one or more client-side users, in response to the client-side user adjusting their orientation.

In accordance with certain embodiments, a method also includes producing a three-dimensional (3D) model of the host site using the host site audio-visual feed, and assigning or otherwise obtaining for each client-side user, of the one or more client-side users, a virtual location within the 3D model of the host site and thereby mapping each client-side user to a real-world location at the host site.

In accordance with certain embodiments, a method also includes producing for a client-side user a synthesized audio-visual feed that appears as if it were generated by a capture device located at the virtual location of the client-side user within the three-dimension model of the host site. The method further includes providing the synthesized audio-visual feed, or a modified version thereof, to the client device of the client-side user to thereby enable consumption thereof by the said client-side user. The synthesized audio-visual feed produced for a client-side user changes in response to the client side user's virtual location at the host site changing. More specifically, when the client-side user moves from a first virtual location at the host site to a second virtual location at the host site, the synthesized audio-visual feed changes from appearing as if it were generated by a capture device located at the first virtual location to appearing as if it were generated by a capture device located at the second virtual location.

In accordance with certain embodiments, a method includes causing to display on an augmented reality (AR) device being used by a host-side user, a visual representation of at least one of the one or more client-side users at their respective virtual location within the three-dimensional model of the host site and with their respective orientation. When the virtual location of the client-side user changes, the visual representation the client-side user displayed on the AR device changes. More specifically, when the client-side user moves from a first virtual location within the 3D of the host site to a second virtual location within the 3D model of the host site, the visual representation of the client-side user changes from being at the first virtual location to being at the second virtual location.

In accordance with certain embodiments, a method also includes in response to orientation information from a head mounted display (HMD) type of client device indicating that a first client-side user has changed their head pose, changing how an orientation of a representation of the first client-side user is displayed on the host device and on client device of another client-side user.

In accordance with certain embodiments, in response to orientation information from a client device indicating that a first client-side user has changed their viewport by performing panning and/or tilting, there is a changing of how an orientation of a representation of the first client-side user is displayed on the host device and on client device of another client-side user.

In accordance with certain embodiments, the audio-visual feed received from the host device includes wide-field-of-view (FOV) visual data for a wide-FOV of the host site, and a method further comprises receiving in near real-time, from each client device, of the one or more client devices, orientation information that includes an indication of a visual portion of the audio-visual feed that a client-side user of the client device is viewing at any given time, which is less than the entire wide-FOV of the host site. The method further includes modifying the host site audio-visual feed in near real-time, based on the orientation information, to produce one or more modified versions thereof that include less than the entire wide-FOV visual data for the host site and/or emphasize the visual portion of the audio-visual feed being viewed on the one or more client-side devices at any given time, to thereby reduce an amount of data that is provided to each client device, of the one or more client devices.

In accordance with certain embodiments, respective orientation information is received in near real-time from each of a plurality of client devices, each of which is being used by a respective client-side user, and a method further includes determining an aggregate attention area based on the orientation information received in near real-time from the plurality of client devices. In a certain such embodiment the modifying the host site audio-visual feed in near real-time is performed based on the aggregate attention area to thereby produce a modified version of the host site audio-visual feed that is provided to the plurality of client devices. The modified version includes less than the entire wide-FOV visual data for the host site and/or emphasizes the visual portion of the audio-visual feed that corresponds to the aggregate attention area, to thereby reduce an amount of data that is provided to the plurality of client devices.

In accordance with certain embodiments, the orientation information is received in near real-time from each of a plurality of client devices, and the modifying the host site audio-visual feed in near real-time is performed separately for each of the plurality of client devices to thereby produce a separate modified version of the host site audio-visual feed for each of the plurality of client devices.

Embodiments of the present technology are also directed to a system including one or more processor configured to perform any and all of the steps of the methods summarized above.

Embodiments of the present technology are also directed to one or more processor readable storage devices having instructions encoded thereon which when executed cause one or more processors to perform any and all of the steps of the methods summarized above.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

As noted above in the Background, various different types of technology exist for allowing people that are located at different physical locations to communicate with one another auditorily and visually. However, such existing technology has been primarily focused either on symmetrical bidirectional videoconferencing or one-to-many broadcast.

In symmetrical bidirectional videoconferencing, each participant has a camera, a microphone, and a speaker coupled to and/or incorporated into a respective computing device that the participant owns or otherwise has access to use. As the two or more participants of the video conference speak to one another, their voices are carried over a data network and delivered to the other's speaker(s), and whatever images appear in front of the video camera appear on a display screen of the other participant's computing device. In other words, an audio-video feed of each participant (which is captured by the computing device being used by the participant) is provided to the computing device(s) being used by the one or more other participants, so that each participant can listen to the other participant(s) and view the other participant(s), typically in a separate window shown on a display screen. A web-based video conference, also known as a webinar, is an example of a one-to-many broadcast, where an individual (or multiple individuals) hosts a seminar that numerous distributed participants can listen to and view. In a one-to-many broadcast, the individual(s) that is/are hosting the seminar cannot typically listen to and view (at least not continually) the numerous distributed participants, whom can also be referred to as attendees.

Despite the various types of videoconferencing that are presently available, some of which were described above, there is still a desire for more immersive teleconferencing options. In accordance with certain embodiments described herein, one or more remote participants can view a near real-time immersive feed of a real-world scene, while communicating in near real-time both with the people in the real-world scene as well as with other remote participants.

Figure 1:
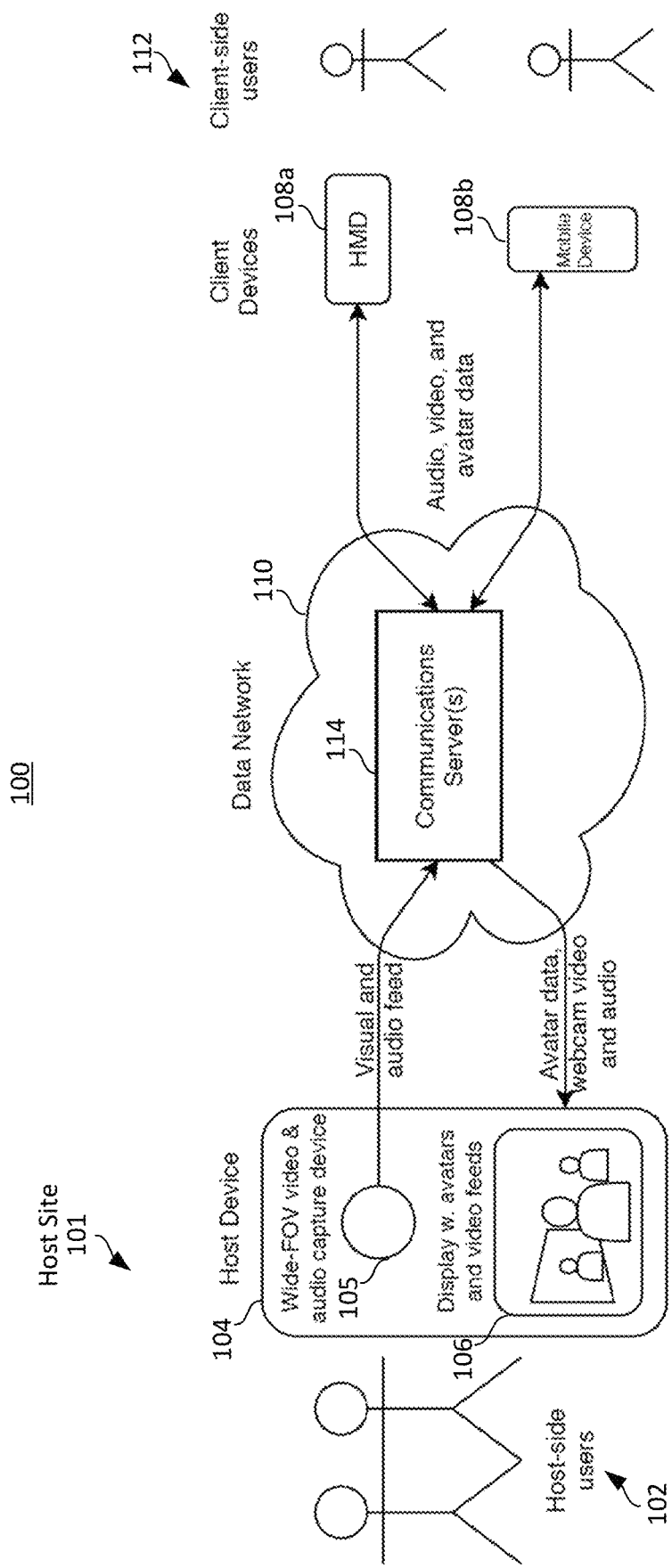
FIG. 1 is a high level schematic block diagram that is used to show an example system with which embodiments of the present technology can be used.

FIG. 1 illustrates a system 100 according to an embodiment of present technology that enables near real-time communication among and between real and virtual participants. Actual video of a real participant is viewable by one or more other participants. By contrast, where a participant is a virtual participant, an avatar of that virtual participant is viewable by one or more other participants. While an avatar may resemble the participant that the avatar represents, it is noted that an avatar need not resemble a human, but can essentially resemble anything that a participant wants, such as an animal, robot, superhero, etc., or more generally anything that a participant (aka user) can imagine. Nevertheless, if is often the case that a person selects and/or designs their avatar to at least somewhat resemble them, e.g., by having their avatar have their actual hair color, skin color, and/or the like, but that need not be the case.

The system 100 is shown as including a plurality of communication devices that have communication capabilities that enable the computing devices to communicate with one another via a data network 110. The data network 110 is shown as including one or more communication server(s) 114, each of which can include one or more processors. Such communication server(s) 114 can be used to route data packets that include data for audio-visual feeds, and the like, among various computing devices. Example communication devices include, but are not limited to, a smartphone, a smartwatch, a tablet computer, a notebook computer, a desktop computer, a gaming console, a virtual reality (VR) headset, or an augmented reality (AR) headset. VR headsets and AR headsets are example types of head mounted displays (HMDs). Accordingly, use of the term HMD can refer to a VR headset or an AR headset. An AR device need not be an HMD, and thus, may be referred to more generally as an AR device (which may or may not be an HMD). Example VR headsets include the Oculus Rift™ available from Oculus VR, Inc. (headquartered in Menlo Park, Calif.), the HTC Vive™ available from HTC Corporation (headquartered in New Taipei City, Taiwan), the Samsung Gear VR™ available from Samsung (headquartered in Seoul, Korea), just to name a few. Example AR devices include the HoloLens™ available from Microsoft Corporation (headquartered in Redmond, Wash.), the Lightwear™ available from Magic Leap (headquartered in Plantation, Fla.), and late-model smartphones and tablets running Apple's ARKit or Google's ARCore platforms just to name a few. Example details of computing devices used in the systems described herein, including the system 100 (as well as the systems 300 and 400, etc.), are described below with reference to FIG. 8.

In accordance with certain embodiments of the present technology, there are two different classes of communication devices, including "host" communication devices and "client" communication devices. The host communication devices can be referred to more succinctly as host devices, or even more succinctly as hosts. The client communication devices can be referred to more succinctly as client devices, or even more succinctly as clients. In FIG. 1 a single host device 104 is shown, and two client devices 108a and 108b are shown. The client devices can be referred individually as a client device 108, or collectively as client devices 108. The system 100 can include more than one host device 104. Such host devices can be referred to individually as a host device 104, or collectively as host devices 104. The client device(s) 108 and the host device(s) 104 can communicate with one another via the data network 110 to which the client device(s) 108 and the host device(s) 104 are connected wirelessly and/or via one or more wired connections. Users of client devices 108 can be referred to herein as client-side users, remote participants, or virtual participants. Users that are located at a host site 101 can be referred to herein as host-side users, local participants, or real-world participants.

The data network 110 can include, for example, a local area network (LAN), a wide area network (WAN), a wireless network, an intranet, a private network, a public network, a switched network, or combinations of these, and/or the like, and may include the Internet. Accordingly, it can be appreciated that the data network 110 can include multiple sub-networks.

Host devices, such as the host device 104 in FIG. 1, capture a near real-time video and audio feed from a host site 101 (which is a real-world location), making these feeds available to virtual participants, and also may provide an audio speaker and microphone and optionally a display, thereby enabling communications from virtual participants to the real-world host site 101. The host device 104 is shown as including a video and audio capture device 105, which can include one or more cameras and one or more microphones. In accordance with certain embodiments, the video and audio capture device 105 is a wide-FOV capture device, such as a 360-degree camera, an example of which is discussed below with reference to FIG. 2. The captured near real-time video and audio feed is also referred to herein as the audio-visual feed. The host device 104 is also shown as including a display screen 106, which can be used to display one or more video feeds of one or more other participants, as well as one or more avatars of one or more other participants of a video conference. The host device 104 can also include one or more speakers that output audio of other participants of a video conference. In certain embodiments, a so called "host device" 104 can include multiple devices that are coupled to one another wirelessly or via one or more wires. For an example, a host device 104 can include a 360-degree camera (e.g., 204) that is communicatively coupled to a smartphone, tablet computer, or laptop computer, or the like. In such an embodiment, the 360-degree camera can be used to capture wide-FOV visual data of a host site 101 and one or more host-side users 102. One or more microphones of the 360-degree camera and/or the smartphone, tablet computer, or laptop computer, and/or discrete microphone(s) can be used to obtain audio data from the host site 101 and one or more host-side users 102. A processor of the smartphone, tablet computer, or laptop computer can be used to perform calculations, encoding, decoding, and/or other processing needed to implement embodiments of the present technology. Communication capabilities (e.g., provided by a transceiver) of the smartphone, tablet computer, or laptop computer can be used to provide visual and audio data of the host site 101 and host-side user(s) 102 to communication server(s) 114 and/or client devices 108, and to receive visual and audio data from the communication server(s) 114 and/or client devices 108. In other embodiments, a host device 104 is a single integrated device. Other variations are also possible and within the scope of the embodiments described herein. The communication server(s) 114 can be co-located at the host site 101 and/or in any other location (e.g., "the cloud"). In certain embodiments, a host device can provide the capabilities of a communication server 114, and thus, can implement a communication server 114.

Clients devices 108, such as the client devices 108a and 108b in FIG. 1, are used by remote participants to access the audio-visual feed from one or more host devices 104 and from other client devices of other client-side users. In other words, each remote participant (also referred to as a remote user or a client-side user) has access to and uses a client device 108. Each of the client devices 108 has a near real-time audio connection, enabling voice chat among users employing the client devices ("client-side users") as well as with users present at the host location ("host-side users"). In FIG. 1, example host-side users are labeled 102, and example client-side users are labeled 112. Each of the client devices 108 may also provide a visual representation of the client-side user 112 of the client device 108 to other participants by providing visual data to communication server(s) 114, a host device 104, and/or other client devices 108. For example, where the client device 108 being used by a client-side user 112 is an HMD type client device, the visual representation of that client-side user 112 can be an avatar associated with that client-side user 112. For another example, where the client device 108 being used by a client-side user 112 is a smartphone, tablet computer, or laptop computer type of client device that includes a camera (e.g., webcam), the visual representation of that user 112 can be provided by an actual video stream of that user's real-world body (which can be an entire real-world body, or more likely, just a portion thereof) captured by the camera of the client device 108. Audio data can also be provided from client devices 108 to a host device 104, communication server(s) 114, and/or other client devices 108. Both client-side users 112 and host-side users 104 are thus able to hear each other and see visual representations of each other, and are able to communicate with each other via voice chat and the motions of their avatars or real-world bodies. Additionally, as will be described in additional detail below, client device 108 can also provide orientation data to a host device 104, to communication server(s) 114, and/or to other client devices 108. The site at which the host device(s) 104 and one or more host-side users 102 are co-located can be referred to as the host site 101.

In accordance with certain embodiments of the present technology, the entire field-of-view (FOV) of video that is captured by a wide-FOV capture device 105 cannot be viewed by a client-side user 112 at one time. Rather, the client-side user 112 must maneuver or otherwise control the panning and/or tilting of the client device 108 they are using in order to view the entire FOV capture by the wide-FOV capture device 105. For example, if a wide-FOV capture device 105 located at the host site 101 is a 360-degree camera (e.g., the same as or similar to the camera 205 described below with reference to FIG. 2), a client-side user 112 cannot view the entire 360-degree FOV at once. Rather, if the client-side user 112 is using an HMD to view a wide-FOV video feed of the host site 101, the client-side user 112 would need to rotate their head to view the entire 360-degree FOV over multiple instances in time. For another example, if the client device 108 is a hand-held tablet computer, the client-side user 112 would need to "pan" left or right and/or "tilt" up and down to in order to view the entire wide-FOV (e.g., 360-degree FOV) generated by one or more host devices 104. In other words, where a client device 108 is an HMD, the client-side user 112 can perform panning and/or tilting by rotating and/or tilting their head. Where the client device 108 is not an HMD, the client-side user 112 can perform panning and/or tilting using a user input device, such as a touchpad, joystick, mouse, and/or the like, or by physically rotating and/or tilting a client device 108 that has appropriate sensors (e.g., an accelerometer, a magnetometer, and/or a gyroscope), depending upon the specific implementation. The portion of a video feed that a client-side user 112 is viewing at any given time, which is less than the entire FOV of the video feed, is often referred to hereafter as the "viewport," "attention area," or "region of interest."

One difference between a host-side user 102 and a client-side user 112 is where they are located. More specifically, a host-side user 102 is located at the host site 101 which is presumed to include at least one wide-FOV host capture device 105, and thus real-world video of a host-side user 102, along with the surrounding environment of the host site 101, can be captured by the at least one wide-FOV host capture device 105 located at the host site 101. By contrast, a client-side user 112 is remotely located relative to the host site 101, and thus, real-word video of a client-side user 112 cannot be captured by a wide-FOV host capture device 105 located at the host site 101. Another difference between a host-side user 102 and a client-side user 112 is how they may be represented within a teleconference. More specifically, in certain embodiments, an image of the real-world body of a host-side user 102 is shared with other participants of the teleconference as part of the video feed captured by one or more host devices 104. By contrast, an avatar or an image of the real-world body of a client-side user 112 is shared with other participants of the teleconference. Accordingly, one of the differences between a host device 104 and a client device 108 within the system 100 may be the type of image data they provide within their audio-visual feed. More specifically, image data provided within an audio-visual feed produced by a host device 104 includes real-world image data of a host-side user. Image data provided within an audio-visual feed produced by a client device 108 can include avatar image, location, and/or orientation data, rather than real-world image or video data of a client-side user. However, as noted above, where a client device 108 includes a camera, real-word image data of a client-side user can be included within their audio-visual feed rather than avatar data. Since a host-side user 102 is located at the host site 101, their location and orientation at the host site is a real location and real orientation that can be captured by a wide-FOV host capture device. By contrast, since a client-side user 112 is not located at the host site 101, the location and orientation of the client-side user 112 at the host site 101 is instead represented on one or more display screens 106 or other display devices. An overall goal and effect of the system 100 (or 300 or 400) is to enable the client-side users 112 to share the context and surroundings of the host site environment with the host-side user(s) 102 and/or other client-side users(s) 112. It is noted that in certain embodiments, real-world video is made up of a series of still images, which allows for capture at a higher quality than typical video capture. In certain embodiments, the real-world video can include any type of data from which a visual representation of a user and/or their surrounding environment can be reproduced, including, but not limited, RGB data, Light Detection and Ranging (LIDAR) data, depth image data, structure light data, and/or the like.

The location at which a client-side user 112 is located within a host site 101 is referred to herein as a "virtual location," since the client-side user 112 is not really at the host site 101. Rather, just a virtual representation of the client-side user 112 is at the host site 101, viewable via a host device 104 and/or a client device 108. In other words, a "virtual location" is a location at which a client-side user is represented at the host site on a host device and/or one or more client devices of one or more other client-side users. In certain implementations, a virtual location does not map to a real-world location at the host site. In other implementations discussed below with reference to other FIGS., e.g., where a three-dimension model of the host site is generated, a virtual location does map to a real-world location at the host site. Depending upon the specific implementation, a host device 104 can determine the virtual locations of client-side users 112, or client devices 108 under the control of client-side users 112 can be used to select the virtual locations of client-side users 112. In certain embodiments, when a client-side user 112 joins a teleconference described herein, the client-side user 112 can be assigned to a specific virtual location at the host site 101, as would be the case where people attending a conference are provided with assigned seats. In other embodiments, when a client-side user 112 joins a teleconference described herein, the client-side 112 user can select a virtual location at the host site 101 that is not already occupied, as would be the case where people attending a conference are allowed to select their seats on a first come first serve basis. In certain embodiments, once a client-side user 112 is assigned or selects a virtual location at the host site 101, they will remain at that virtual location for the remainder of the teleconference. In other embodiments, a client-side user 112 can be reassigned to a different virtual location or can on their own choose to change their virtual location. In each of these embodiments, a representation of the client-side user 112 can be seen by one or more host-side users 102 located at the host site 101, as well as by other client-side users 112 that are remote from the host site 101. The representation of the client-side user 112 can be video of the real-world body of the client-side user which is captured by a camera of the client device 108 being used by the client-side user (e.g., the camera can be a webcam at the top of a laptop computer screen). Alternatively, the representation of the client-side user 112 can be an avatar of the client-side user 112 which can be rendered and controlled by the client device 108 being used by the client-side user 112 (e.g., where the client device 108 is or includes an HMD). The data that specifies a virtual location for a client-side user 112, at the host site 101, can be referred to herein as virtual location information. Where a client-side user 112 is assigned or otherwise positioned at a specific virtual location at the host site 101, the host device that is located at the host site can determine the virtual location information, or alternatively a communication server 114 can determine the virtual location information. The virtual location information, which can also be referred to as virtual location data, can include X,Y coordinates, or X,Y,Z coordinates, which are relative to a location of a host capture device at a host site, or relative to some other location at the host site. Alternatively, the virtual location information can be in terms of radians, or quaternions, but are not limited thereto. It would also be possible for a client device 108 to determine a virtual location of the client-side user 112 at the host site 101, e.g., if the client-side user 112 is allowed to select their location at the host site 101. Other variations are also possible and within the scope of the embodiments described herein.

In accordance with certain embodiments of the present technology, locations and orientations of representations of client-side users 112 (i.e., images of real-world bodies or avatars) are displayed so that for each of the client-side users 112, the orientation of the representation of the client-side user 112 corresponds to the orientation with which the client-side user 112 is consuming (aka viewing) a video feed. Accordingly, one or more host-side users 102 and one or more other client-side users 112 can see what a client-side user 112 is looking at, or at least can see the directions they are looking. In certain embodiments, the orientation of a client-side user 112 can be their head-pose, which can specify, e.g., whether they are looking straight ahead, to their right or to their left, up or down, and at what specific angles. In other embodiments, the orientation of a client-side user can be determined based on the portion of the wide-FOV video feed that the client-side user 112 selected to view (aka consume) on a display screen using a mouse, touchpad, physical movement of the client device, joystick, trackball, or other means. In other words, the orientation of a client-side user can be determined based on the viewport of a client-side user. Using such orientation information, a representation of a client-side user (i.e., an image of the real-world body or avatar of the clients-side user) can be displayed in a manner that enables such a representation to appear as if they are looking at a specific real-world item and/or at a specific host-side user 102 at the host site 101, or as if they are looking at a representation of another client-side user 112. Further, using such orientation information, representations of multiple client-side users 112 (i.e., images of real-world bodies or avatars of two or more client-side users 112), from the perspective of a host-side user 102, can be displayed in a manner that enables the representations of two or more client-side 112 users to appear as if they are looking at one another, which would be especially appropriate if the client-side users 112 are conversing with one another. From the perspective of two client-side users 112 that are conversing with one another, each of the two client-side users 112 will see the representation of the other client-side user (i.e., the image of the real-world body or avatar of the other client-side user 112), and thus, feel as if they are actually looking at and talking to one another. Where a client-side user 112 is wearing an HMD type of client device 108, orientation information can be obtained by sensors of the HMD. Where the client-side user 112 is interfacing with a non-HMD type of client device 108, orientation information can be obtained by one or more input devices and/or sensors of the client device 108.

In accordance with certain embodiments, when representations of client-side users 112 are rendered, taking into account the orientations of the client-side users 112, a host device 104 (or some other subsystem, e.g., within the data network 110) may compensate for a location offset between a host-side display device and a host-side capture device. For example, if a wide-FOV host camera is mounted above a display screen 106 of a host device 104, then a client-side user 112 that is viewing a specific point of interest in the host scene (at the host site 101) on the same horizontal plane of the host capture device 105 will have a directly horizontal orientation. However, due to the vertical offset of the host display screen 106 relative to the wide-FOV host camera 105, if the representation of that client-side user 112 on the host-side display 106 is shown with a corresponding directly horizontal orientation, the representation of the client-side user 112 will not seem to be "looking at" the point of interest in the host scene (at the host site 101). Rather, due to the aforementioned vertical offset, it may appear as if the representation of the client-side user 112 is looking below the point of interest in the host scene (at the host site 101). To compensate for this offset, the host-side display system (or some other subsystem) may modify the orientation of the representation of client-side user's rendering, in this example case tilting the representation slightly up from the horizontal plane so as to compensate for the display/capture offset.

Figure 2:
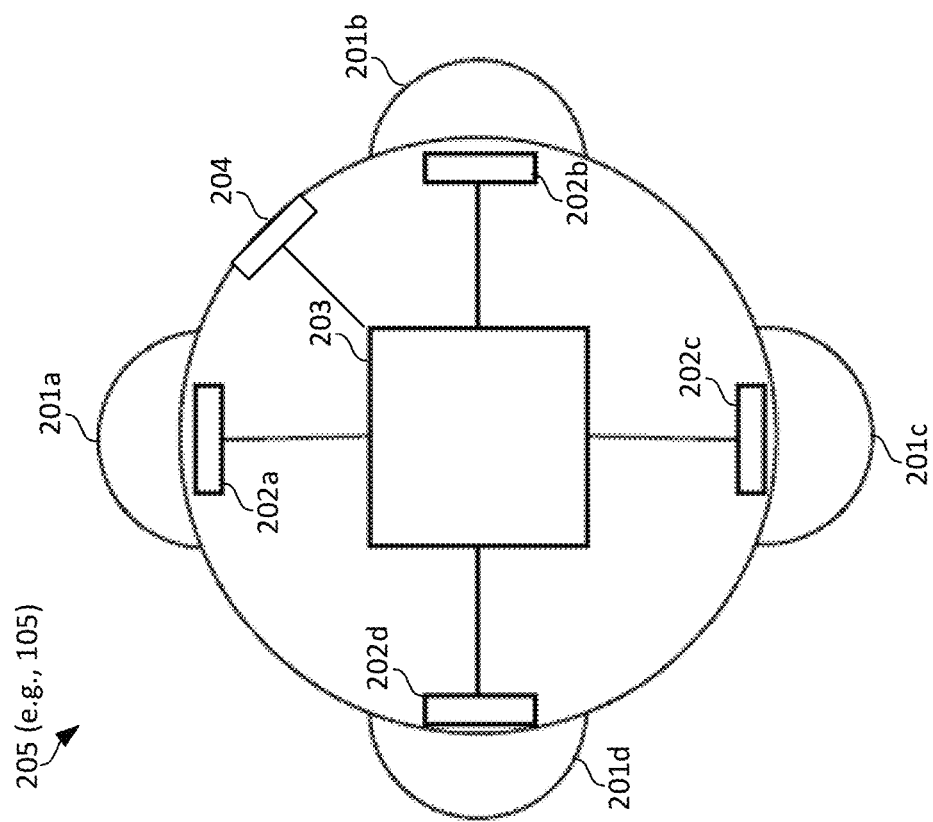
FIG. 2 is a high level schematic block diagram that is used to show an example 360-degree camera type capture device with which embodiments of the present technology can be used.

FIG. 2 is a high level schematic block diagram that is used to show an example 360-degree camera 205 type wide-FOV capture device 105 of a host device 104. Referring to FIG. 2, the 360-degree camera 205 is shown as including wide-FOV lenses 201a, 201b, 201c and 201d, image sensors 202a, 202b, 202c and 202d, and one or more processing unit(s) 203. Each of the wide-FOV lenses 201a, 201b, 201c and 201d can collect light from a respective wide-FOV, which can be, e.g., between 120-220 degrees of the field. A radial lens/sensor arrangement is shown, but a wide variety of different arrangements can alternatively be used, and are within the scope of the embodiments described herein. More or less lenses 201 and image sensors 202 than shown can be used. The camera 205 can provide a full spherical 360-degrees horizontal by 180-degrees vertical of coverage, but in alternative embodiments, coverage of a full sphere need not be provided. Each of the lenses 201a, 201b, 201c and 201d focuses a respective image onto a respective one of the imaging sensors 202a, 202b, 202c and 202d, with lens distortion occurring due to the wide-FOV. Each of the imaging sensors 202a, 202b, 202c and 202d converts light incident on the sensor 202 into a data signal (e.g., which can include RGB data, but is not limited thereto). The processing unit(s) 203, which can be embedded within a camera body, receive the data signals from the imaging sensors 202a, 202b, 202c and 202d and perform one or more imaging processing steps, before sending one or more image frames on an outbound data feed. These image processing steps can include, but are not limited to: debayering, dewarping, color correction, stitching, image compression, and/or video compression. The 360-degree camera 205 is also shown as including a microphone 204 that can be used to capture audio of an audio-visual feed that is produced by the 360-degree camera 205. One or more additional microphones can also be included to provide improved audio capture and/or stereoscopic or spatial audio. Examples of 360-degree cameras that can be used with embodiments of the present technology, include, but are not limited to, the Insta360 One X™ available from Shenzhen Arashi Vision Co., Ltd. (headquartered in Shenzhen, Guangdong, China) and the Ricoh Theta V™ available from Ricoh Company, Ltd. (headquartered in Chuo, Tokyo, Japan).

In accordance with certain embodiments, orientation data may be used to improve the efficiency and/or quality of a visual data feed. Generally speaking, at any given time the client devices 108 (e.g., 108a and 108b) each typically display a narrower field of view (FOV) than is available from a host capture device 105. In order to consume the full field of view content, client-side users 112 perform panning and/or tilting via user inputs to client devices 108. For example, client-side users 112 that are each wearing an HMD type of client device 108 can rotate and tilt their heads to follow the action, or more generally, to look around a host site 101. Client-side users 112 that are using other types of client devices 108 (besides an HMD) typically have some other means to pan, tilt, or even zoom the video feed, e.g., by dragging a finger across a mobile device screen or a touchpad, maneuvering a joystick, trackball, or mouse, and/or the like, or by physically rotating and/or tilting the client device 108. Data that specifies the portion of a video feed that a client-side user 112 is viewing at any given time, and thus specifies the viewport of the client-side user 112, can be referred to herein as "viewport orientation data". Such viewport orientation data is a type of orientation data that can be output by a client device 108. This "viewport orientation data" from client devices 108 of client-side users 112 viewing any single camera feed (e.g., from a host capture device 105) may be communicated to the communications server(s) 114 and/or the host device 104 in near real-time. This viewport orientation data may be aggregated to indicate the overall aggregate area of interest ("attention area") in each camera feed. Since the client devices (e.g., 108a, 108b) do not display the full FOV of the video feed captured by a host capture device 105 at any given time, processing and delivery of the full FOV is wasteful. A simplistic optimization would be to generate multiple separate video feeds (e.g., at a host device 104 or communication server 114) that correspond directly to the portion of the full video frames requested by the specific client devices (e.g., 108a or 108b), such that each client device 108 of each client-side user 112 (of a plurality of client devices 108 of a plurality of client-side users 112) would receive its own respective custom video feed. However due to the latency in data transmission of viewport orientation data, as well as in video processing and compression, such an approach would likely not be able to react quickly enough to changes in client device orientation in order to fill the full client device viewport with data. In other words, when the viewport orientation changes, several incomplete frames would be delivered and rendered.

Certain embodiments of the present technology provide for more elegant and efficient optimization techniques that avoid or overcome the aforementioned latency issues. In accordance with certain embodiments, near real-time viewport orientation data from multiple client devices 108 are used to determine the specific portions of the full FOV (captured by a host device 104) that occupy the viewports of multiple users (the "attention areas"). In accordance with certain embodiments, data from more than one of the client devices 108 are aggregated to create a combined attention area, which can also be referred to as the "aggregate attention area," "aggregate viewport," or "aggregate area of interest." Based on the aggregate attention area, one or more output streams may be generated with an emphasis on the aggregate attention area, e.g., using an asymmetric projection, such as an asymmetric cube map projection, which is also known as an offset cube map projection. Such a projection has the effect of devoting a larger area in the encoded video frames to a specific portion of the wide-FOV capture. The aggregate attention area may be recalculated and the inputs to the asymmetric projection may be changed rapidly and regularly, e.g., periodically, such as once per second, and/or in response to changes in the client-side users' respective viewports. The effect is to significantly improve delivery efficiency at a small cost of decreased visual acuity for a short period of time after one or more viewports are changed. The calculating and recalculating of the aggregate attention area can be referred to as "aggregate viewport-optimized encoding." The aggregate viewport-optimized encoding can be performed at the host device 104 or by the communication server(s) 114, or by a combination thereof, in near real-time. In specific embodiments, full-resolution and full-FOV data is delivered to the communication server(s) 114, and then one or more communication server(s) 114 and/or more generally a cloud-based system performs the aggregate viewport-optimized encoding based on viewport orientation data received from multiple client devices 108.

Viewport-optimized encoding can be performed in near real-time for an aggregate attention area, as noted above. In alternative embodiments, viewport-optimized encoding can be performed for individual client-side users in near real-time based on individual viewports of client-side users as determined by respective individual client devices. Individual client based viewport-optimized encoding can be performed at the host device 104 or by the communication server(s) 114, or by a combination thereof, in near real-time. In specific embodiments, full-resolution and full-FOV data is delivered to the communication server(s) 114, and then one or more communication server(s) 114 and/or more generally a cloud-based system performs the individual client viewport-optimized encoding based on viewport orientation data received from each one of multiple client devices 108.

In accordance with certain embodiments, multiple host devices 104 are placed at the host site 101, and individual client-side users 112 are provided with the option to select from which host device 104 to view a video feed. Further, is such an embodiment, the display of a client-side user's avatar or real-world body may switch from one host device display 106 to another, illustrating to the host-side users 102 which virtual location the client-side user 112 is currently occupying.

In certain embodiments, a host device 104 may be in motion, e.g. if carried by a host-side user 102 (e.g., via a selfie stick or just by hand), if mounted on a host-side user 102, or if mounted on a mobile platform or robot, and/or the like. Video compression efficiency drops significantly for cameras in motion. In order to maintain quality in such deployments, the host device 104 can make use of inertial measurement unit (IMU) data from the host device 104 in order to recognize motion, and to modify resolution and/or frame rate of the video encoding output in order to maintain a specified level of visual quality. For example, if motion is detected, frame rate might be reduced dynamically in order to reduce visual artifacts at the expense of lower resolution. In certain embodiments, the host device 104 can include an accelerometer, a magnetometer, and/or a gyroscope to detect motion and/or orientation of the host device 104.

In certain embodiments, bandwidth availability for a host device 104 may be limited and/or fluctuating. The host device 104 and/or communications server(s) 114 may monitor available bandwidth through several means (e.g., operating system packet loss data, Wi-Fi and/or other wireless network connectivity data, acknowledgement and/or error data) and modify video encoding parameters in order to maintain at least some specified level of (and preferably maximize) visual quality for the available bandwidth. For example, if bandwidth availability drops, frame rate and/or resolution of the video feed may be reduced dynamically to maintain at least some specified level of visual quality. If bandwidth availability increases, frame rate and/or resolution may be increased.

Figure 3:
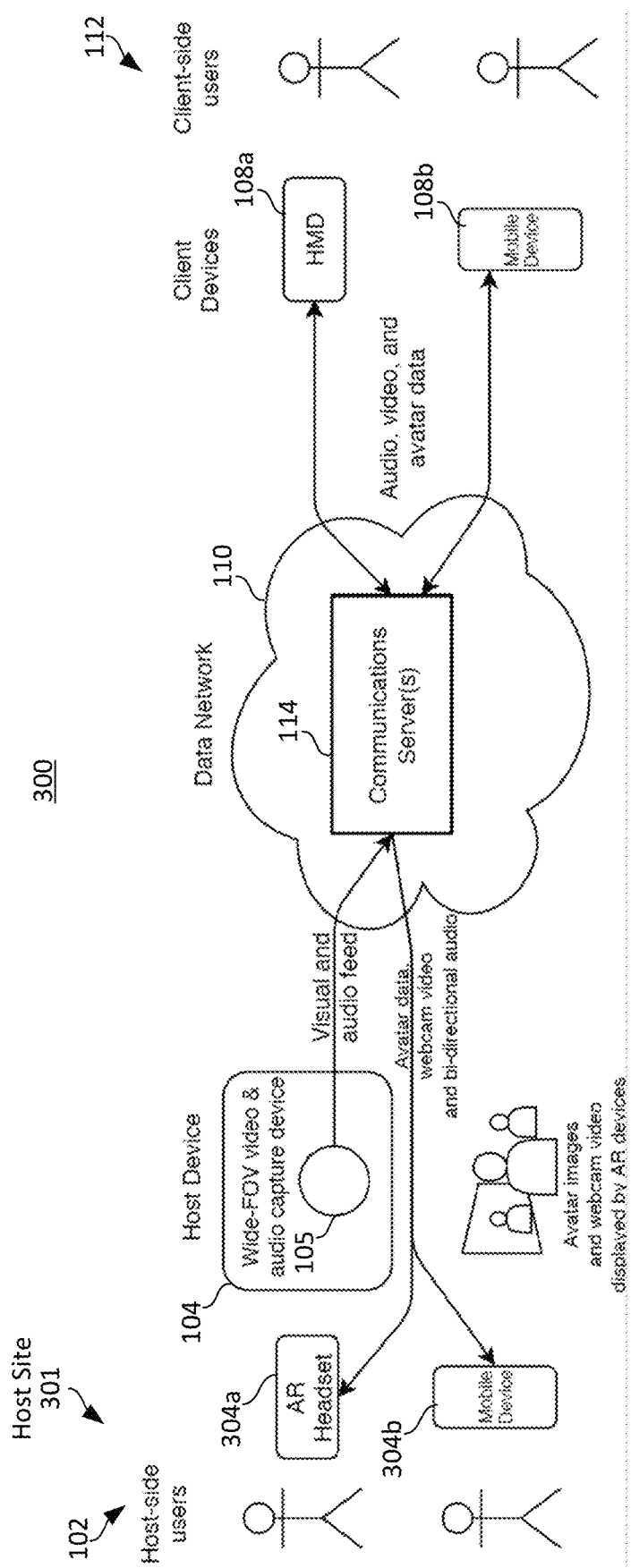
FIG. 3 is a high level schematic block diagram of a system according to an alternative embodiment present technology that enables real-time communication among and between real and virtual participants.

FIG. 3 illustrates a system 300 according to an alternative embodiment present technology that enables near real-time communication among and between real and virtual participants. Elements in FIG. 3 that are the same as they were in FIG. 1 are labeled the same and are not described again in detail, because reference can be made to the above description of FIG. 1 for such details. As can be appreciated from a comparison between the system 100 shown in FIG. 1, and the system 300 shown in FIG. 3, the system 300 is similar to the system 100, except that one or more host-side users 102 at a host site 301 use AR headsets and/or AR mobile devices in FIG. 3 to observe visual representations of client-side users (rather than a display screen 106 that is not part of an AR device). Such an AR headset 304a or AR mobile device 304b can be referred more generally as an AR device 304. In such an embodiment, each AR device 304 can include one or more displays and/or one or more speakers that enable a host-side user 102 to view avatars or real-world video of one or more client-side users 112 and/or one or more other host-side users 102, and listen to audio of one or more client-side users 112 and/or one or more other host-side users 102. An AR display of an AR device can be a see-through display. One or more microphones of an AR device 304 can capture audio of a host-side user 102. Additionally, or alternatively, audio of a host-side user 102 can be captured by a wide-FOV video and audio capture device, such as the wide-FOV camera 205 discussed above with reference to FIG. 2, but is not limited thereto. In certain embodiments, software on an AR device 304 is able to identify a location of a host capture device (e.g., 105), and the visual representations of client-side users 112 are displayed to host-side users 102 as augmented 3D content co-located with the host capture device. The AR device 304 just described above is an example of a type of host device 104. The host site 301 shown in FIG. 3 is an example of the host site 101 introduced above with reference to FIG. 1.

Still referring to FIG. 3, visual data collected from one or more host devices 104 (e.g., including AR devices 304a and/or 304b) can be used to generate a partial or complete three-dimensional (3D) model of a host site (e.g., 301), registering the location of some or all of the host devices in space. Such a model may be generated using various different techniques, including, but not limited to, Simultaneous Localization and Mapping (SLAM), Structure from Motion (SfM), employing one of several commercially-available systems (e.g. ARKit, ARCore, Vuforia), or a custom solution. Different spatial models generated by different devices or techniques may be fused using a variety of techniques including the analysis and comparison of registration points in the visual data from the various sources. The outcome of this process can be a single 3D model, updated periodically, specifying the location of the various host devices as well as partial or complete geometry of the host site itself (e.g., walls, floors, objects, etc.). The generation of an individual 3D model and/or the fusion of multiple 3D models may occur via software running at the communications server(s) 114 and/or at one or more of the host devices 104, 304. The 3D model may be shared with the communications server(s) 114 and with and among the client devices (e.g., 108a and/or 108b).

Since the 3D location of a host device 104 is known, the client devices 108 (e.g., 108a and 108b) which display the visual feed generated by the host device 104 can be considered to have a "virtual location" in the host site space (e.g., 101, 301) that corresponds to the host device 104. Software on the client devices (e.g., 108a and 108b) can be provided with access to the shared 3D model generated by a model generation system, and may make use of this model to improve the rendering of the visual feed generated by the host device 104, and/or to augment the visual feed with additional content as described below. The overall effect of the shared 3D model is to create a shared 3D context among both remote and local users. The aforementioned model generation system can be implemented by the communication server(s) 114 and/or one or more host devices 104, 304.

In certain embodiments, the shared 3D model generated by the system described above may be resolved against a third-party spatial database, e.g. a Building Information Model (BIM) or a map with absolute latitude, longitude, and altitude. In such an embodiment, 3D content from the third-party spatial database may be assigned to its corresponding location in the system's shared 3D model, and thus displayed by client-side and host-side devices in real-world locations that correspond to its location in the third-party spatial database. For example, the specific geometry of an HVAC system as stored in a BIM may be displayed to host-side users as AR overlay in its corresponding real-world location; at the same time, the same HVAC system geometry may be displayed to client-side users as an overlay in their VR (or mobile or other device) display of the live video feed of the host site 101, 301.

Figure 4A:
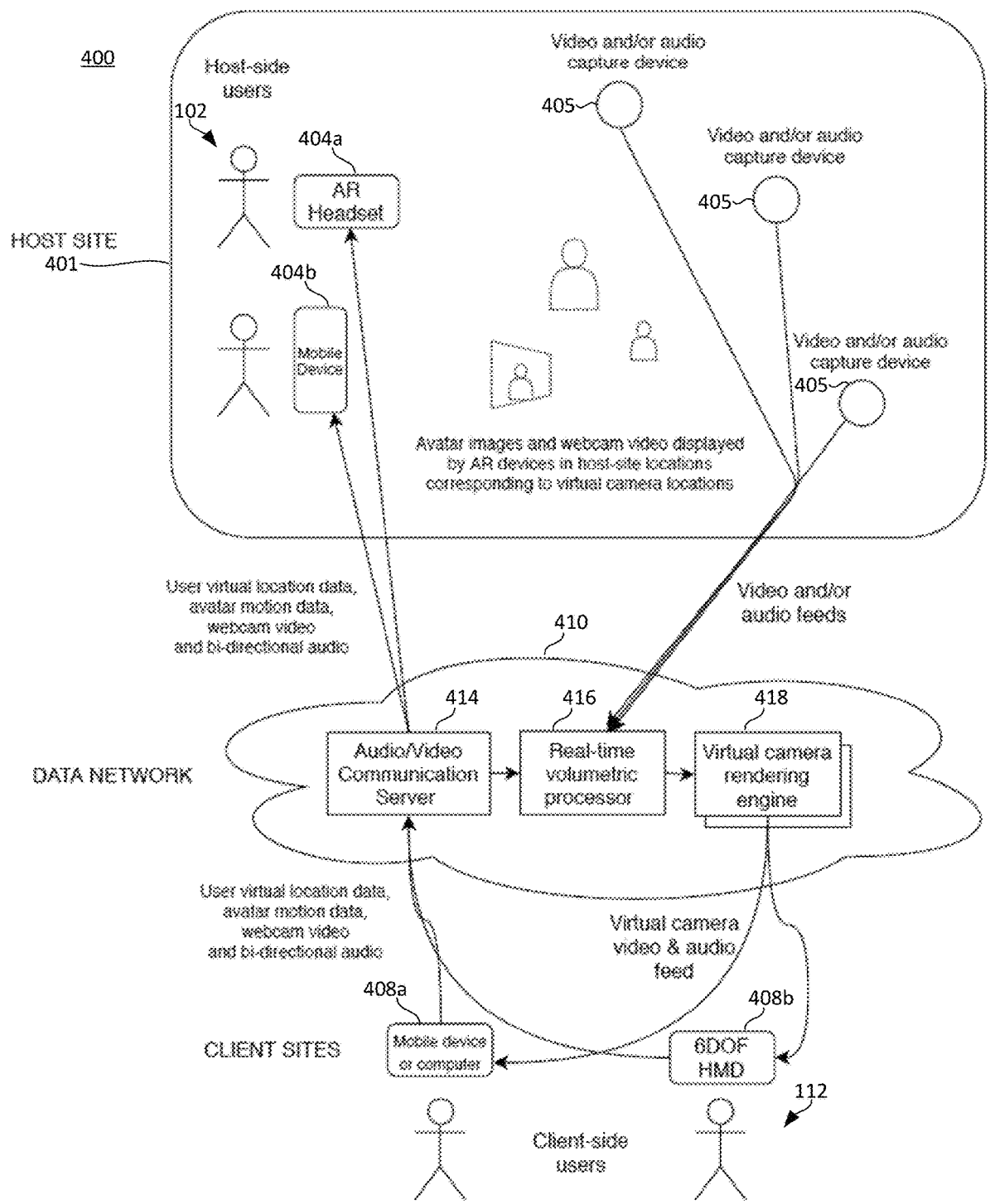
FIG. 4A is a high level schematic block diagram of a system according to a further embodiment present technology that enables real-time communication among and between real and virtual participants.

FIG. 4A illustrates a system 400 according to another embodiment of the present technology. In this particular embodiment, there are three classes of devices, including host capture devices 405, host display devices 404, and client devices 408. One or more host capture device 405 located at a host site 401 capture near real-time video and/or audio feed from the host site 401 (which is a real-world location) and deliver that feed to a data network 410. In certain implementations, several host capture devices 405 are employed in order to enable wide coverage of the host site 401, allowing a 3D model of the real-world location to be generated by a cloud-based system. Such a model may be used as a supplement to or a replacement of the SLAM-based or SfM-based model referenced above.

Still referring to FIG. 4A, host display devices 404 (e.g., 404a and 404b in FIG. 4A) provide AR images and audio chat content to host-side users 102. Client display devices 408 (e.g., 408a and 408b in FIG. 4A) are used by client-side users 112 to access the system 400. A client display device 408 can be, e.g., a smartphone, a smartwatch, a tablet computer, a notebook computer, a desktop computer, a gaming console, a VR headset, or an AR headset, but is not limited thereto. Each of the connected plurality of client display devices 408 has a near real-time audio connection, enabling voice chat among users employing client devices ("client-side users") as well as with users present at the host site 401 ("host-side users"). Each of the client devices 408 may also provide a visual representation of respective client-side users 112 to other participants, which for HMD-based client devices may be an avatar and for other client devices may be a video stream from e.g., a webcam or other camera attached to or integrated into a client device 408. Each of the client devices 408 also provides location data indicating the client-side user's virtual location within a volumetric space (aka 3D space) that represents the host site 401. Client devices 408 can also provide orientation data of client-side users 112 using the client devices 408.

In addition to the devices 404, 405, and 408, the system 400 can also include processing components that are part of the data network 410, which may be co-located at the host site 401 and/or in any other location (e.g., "the cloud"). These processing components can include an audio-visual communication server 414, a near real-time volumetric processor 416, and one or more virtual camera rendering engines 418. In accordance with certain embodiments, these processing components ingest video and/or audio feeds from the host capture devices 405, and/or video feeds, audio feeds, and/or 3D model data generated by host-side AR devices 408, and generate a volumetric model of the real-world space represented by these feeds, using established computational photography techniques. The virtual camera rendering engine(s) 414 is/are employed to generate a video feed of the 3D model corresponding to a single client-side user's virtual location. More specifically, a synthesized audio-visual feed can be generated for each client-side user, which synthesized audio-visual feed appears as if it were generated by a capture device located at the virtual location of a client-side user within the 3D model of the host site. The virtual camera rending engine(s) 414 can produce the synthesized audio-visual feed(s). In other words, each synthesized audio-visual feed for a specific client-side user can appear as if it were generated by a virtual camera located at the virtual location of the client-side user with the 3D model of the host site. Avatar and/or real-world video representations of the other client-side users 112 in their respective virtual locations may also be integrated into this audio-visual feed. This audio-visual feed can also include a visual representation of host-side user(s) 102 that are located at the host site 401. A synthesized audio-visual feed is delivered to the corresponding client display device 408 for display to the client-side user 112. In certain embodiments, a client device can itself generate the representation of the client-side user that is using the client device, and that representation of the client-side user can be provided by the client device 408 to the data network 410, to one or more other client devices 408, as well as to one or more host devices 404. In certain embodiments, the near real-time volumetric processor(s) 416 produce the 3D model of the host site 401. Various camera systems and methods for producing 3D models (also known as 3D volumetric models) of real-world sites are known. Examples of such systems and methods are described in U.S. Pat. No. 10,218,903, titled "Digital 3D/360-degree camera system," which is incorporated herein by reference. Embodiments described herein are not directed to the specific way that such a 3D model of a host site is generated. Rather, certain embodiments described herein utilize such a 3D model once it is generated. The virtual camera rendering engine(s) 418 can render a video feed from the viewpoint of specific client-side users based on where such client-side users (and more specifically, their representation) are virtually located within the 3D model of the host site. In certain embodiments, each client-side user is allocated a respective virtual camera rendering engine, enabling each client-side user to consume a feed specific to their selected viewport.

Each client-side user 112 may move to any virtual location within the modeled host site area. In some embodiments, this virtual change of location may be mapped directly on to the client-side users' actual motion through her own local space. For example, when a client-side user 112 moves three feet to the left in her real-world local space, her virtual location in the host site 401 moves correspondingly, and the visual feed from the rendering engine 418 is updated to be rendered from the viewpoint of the new virtual location. In such a way each client-side user 112 can feel as if they move through the host-site 401 as if they were physically there. Alternatively, users may "jump" or "teleport" from one virtual location to another, for example by pointing to the location with a user input device (e.g., a handheld controller) and/or selecting a physical button or virtual control. The scale of the client-side real space and the Host Site virtual space is not required to map 1-to-1, e.g., they can instead map 1-to-N (e.g., 1 to 10), such that one foot in the client-side user's real-world surroundings might correspond to N feet (e.g., 10 feet) in the 3D model of the host site.

In certain embodiments, the host display devices 404 (e.g., 404a and 404b) receive location data from the client display devices 408 (e.g., 408a and 408b), or from a cloud service (e.g., supported by the data network 410), allowing the host display devices 408 to identify the virtual location (e.g., X,Y,Z location) of each client-side user 112 at the host site 401, and then display an augmented reality image corresponding to that client-side user 112 at the appropriate location in the host site 401. This representation of the client-side user 112 may also be displayed with an orientation that corresponds to the client-side user's display orientation and/or head pose relative to that user's video representation of the host site 401. The host display devices 408 may also use virtual audio techniques to spatially position a client-side user's audio at the appropriate location, so it sounds like audio from a client-side user 112 is originating from their virtual location at the host site 401.

Using the system 400, both client-side users 112 and host-side users 102 are thus able to see each other, and to communicate with each other via voice chat and the motions of their avatars or real-world bodies. Each of the host-side users 102 located at the host site 401 and using their host display device 404 will see virtual avatars (or real-world bodies) of one or more client-side users 112 superimposed upon the real-world of the host site 401. Each of the client-side users 112 will see a near real-time reconstruction of the host site 401, with volumetric images of the host-side users 102 and virtual avatars (or real-world bodies) for other client-side users 112. Client-side users 112 can use their client devices to maneuver around the 3D model of the host site 401, and thus, can select their virtual location within the host site 401.

The various systems (e.g., 100, 300, and 400) described above can be used to perform methods according to various embodiments of the present technology. In certain methods, client-side users 112 wearing HMDs (e.g., 108*a*, 408*a*) are represented to host-side user(s) 102. More specifically, each client-side user 112 that is wearing an HMD type of client device 108, 408 may be represented by an avatar to host-side user(s) 102, where the orientation of the avatar on a host-side display 106, or AR device 304 indicates the client-side users' head pose relative to the video feed the client-side user is consuming. For example, if a client-side user's HMD head pose is 45 degrees from directly forward, that user's avatar's head will also be shown on all host-side displays with 45 degrees offset from the forward direction of the video capture. In this way, the representation of the client-side user 112 will indicate to host-side users 102 what that client-side user 112 is looking at.

In certain methods, real-world video of individual client-side users 112 that are using non-HMD type client devices are represented to host-side user(s) 102 and other client-side user(s) 112. More specifically, client-side users 112 not employing HMD type client devices may be represented by video feeds from, e.g., a webcam or other camera. These clients-side users 112 can have the ability to pan and/or tilt their display horizontally and/and vertically in order to view the full field-of-view (FOV) generated by one or more host-side wide-FOV capture devices (e.g., 405 in FIG. 4A). In certain implementations, the video feed from a client device 108, 408 of such a client-side user 112 may be presented to the host-side user 102 as a video mapped onto a 2-dimensional plane, which is then rotated to indicate the client-side user's display pan and title settings. For example, if a client-side user's display pan is 45 degrees from directly forward, that user's video display plane will also be shown on all host-side displays with 45 degrees offset from the forward direction of the video capture. In this way, the representation of the client-side user 112 will indicate to host-side users 102 what that client-side user is looking at.

Figure 4B:
FIG. 4B is a screen shot that shows an example of what a client-side user can see using the system described with reference to FIG. 4A.

FIG. 4B is a screen shot that shows what a first client-side user 112 (not shown in FIG. 4B) may see using the system 400 described above with reference to FIG. 4A, wherein three client-side users (i.e., first, second, and third client-side users 112) and a host-side user 102 are all participating in a teleconference. A host audio-visual feed provided by a host device located at the host site 401 provides the video of the host site 401, which in this case includes a host-side user 102 actually located at the real-world location of the host site 401. The host site 401 in this example is the backyard of the host-side user 102. The host audio-visual feed can be captured, e.g., using a host capture device (e.g., a 360-degree camera) of a host device that is mounted on a tripod, but is not limited thereto. Referring to FIG. 4B, shown therein is the host-side user 102 that is actually located at the host site 401. Also shown in FIG. 4B is an avatar 422 representing a second client-side user 112 that is remotely located relative to the host site 401 and is wearing an HMD. Additionally, a floating screen 432 is shown that includes a video feed from a third client-side user 112 that is remotely located relative to the host site 401 and is sitting in front of a webcam. When the second client-side user 112 rotates their head to change their viewport, their avatar 422 will also rotate its head. When the third client-side user 112 performs panning and/or tilting to change their viewport, their floating screen 432 will also rotate accordingly. Note that what the second client-side user sees using their HMD type of client device would differ from what is shown in FIG. 4B, e.g., the second client-side user would not see their avatar 422, but rather would see an avatar or video-feed of the other client-side users, i.e., the first and third client-side users as well as see the host-side user 102. Similarly, the third client-side user would not see their floating screen 432, but rather, would see an avatar or video feed of the other client-side users, i.e., the first and second client-side users as well as see the host-side user 102.

Each of the client-side users can have access to a wide-FOV, e.g., a full 360-degree sphere surrounding a host capture device, and the orientation information (which can include viewport orientation data) can be used to determine what is provided to client devices of client-side users and/or shown to client-side users. For example, even when consuming the host audio-visual feed on a standard phone or computer, the client-side user can still have access to the full wide-FOV (e.g., a full 360-degree sphere) and can pan and tilt to see around the sphere at will, showing a limited portion of the sphere on their screen at any one time. This is directly analogous to an HMD headset user physically looking around. The orientation representation of a client-side user using a desktop, smartphone, or other non-HMD type of client-side can be provide by rotating their video feed in 3D space, e.g., as shown in FIG. 4B with reference to the rotatable floating screen 432. This provides a way to indicate where client-side user of the non-HMD type of client device is "looking".

In certain methods, usage data from a client-side HMD head pose and/or client-side display pan and tilt may be used to identify regions of high interest within a single wide-FOV video feed. These regions of high interest may then serve as an input to processing by a host device and/or by one or more cloud-based post processor systems. Such processing may include, e.g., modifications to compression parameters, modifications to projection mapping. In this way, near real-time interest data may be used to provide higher quality video for areas of high interest without increasing total bandwidth utilization, as explained above.

In certain methods, the video feed provided to any client display device (e.g., 408) may encompass any FOV up to a full 360 by 180 degrees. It may also include stereo video, depth data, or other metadata sufficient to enable limited six-degree-of-freedom rendering.

In accordance with certain embodiments, a host device may include one or more displays, as will be described below.

In certain embodiments, host devices are configured so as to align the visual capture device (e.g., 105 or 405) with a representation of the eyes of a remote user's (i.e., a client-side user's) avatar, thus creating a simulation of eye contact between the avatar and local users. In cases where device alignment is not possible, the animation of the remote user's avatar may be adjusted to compensate for the offset between the host's video capture device and the host display. More specifically, a head tilt and or eye gaze of a client-side user's avatar can be modified to simulate eye contact between the avatar of a client-side user and a host-side user, or between avatars of two client-side users. This concept was also previously discussed above.

In accordance with certain embodiments, apparatuses described below include and utilize a display device and a capture device (generally a wide-FOV camera) in manner that meets two criteria simultaneously: (1) the display device displays an image of one or more virtual participants' avatars; and (2) the capture device captures the scene from a location at or close to the eye level of the avatars as witnessed by the local participants. The reason to maintain this alignment is to enable the sensation of "eye contact" between local and remote participants.

In accordance with certain embodiments, where a capture device cannot be completely physically aligned with the local display of the avatar, a depiction of an avatar's gaze direction is modified to enable the sensation of eye contact between local and remote participants. More specifically, if the relative position of a camera and display screen is known to the rendering process, the rendered gaze direction of avatars may be adjusted to compensate for the offset. Such compensation may not be perfect, as the actual distance of the point of interest is unknown, but a reasonable assumption can provide some compensation. Alternatively, attention volume data may be used to improve gaze compensation, wherein such attention volume data can be obtaining using techniques described in commonly invented U.S. patent application Ser. No. 16/393,369, filed Apr. 24, 2019, and titled DERIVING 3D VOLUMETRIC LEVEL OF INTEREST DATA FOR 3D SCENES FROM VIEWER CONSUMPTION DATA, which is incorporated herein by reference.

Figure 7:
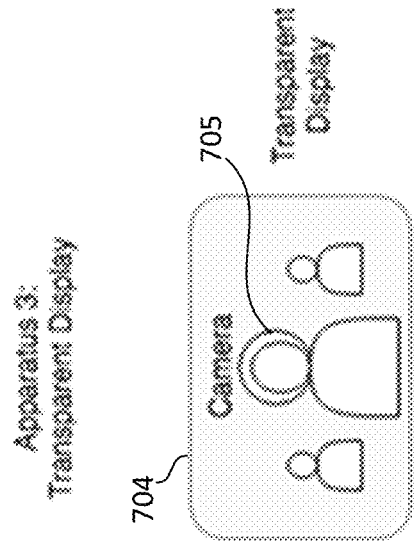
FIG. 7 is a high level schematic block diagram of another sub-system that can be used at a host site in accordance with certain embodiments of the present technology where a host capture device is mounted behind a transparent display screen.
Figure 6:
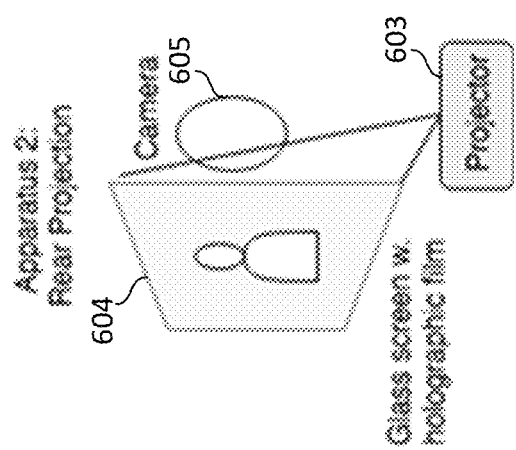
FIG. 6 is a high level schematic block diagram of another sub-system that can be used at a host site in accordance with certain embodiments of the present technology, where a host capture device is located behind a display screen along with a projection device.
Figure 5:
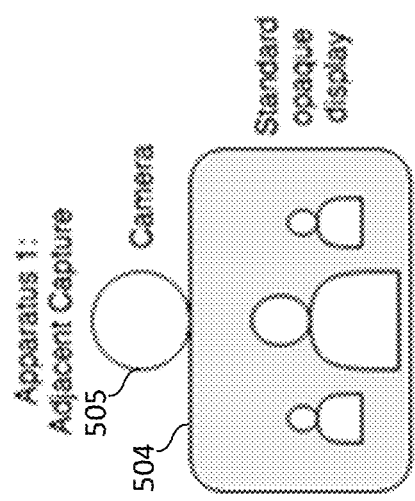
FIG. 5 is a high level schematic block diagram of a sub-system that can be used at a host site in accordance with certain embodiments of the present technology.

FIGS. 5-7 are used to describe various sub-systems (also referred to as apparatuses) that can be used with embodiments of the present technology, e.g., at a host-site 101, 401. Referring to FIG. 5, in accordance with certain embodiments, a host capture device 505 is a wide-FOV capture device (e.g., 205 in FIG. 2) mounted directly adjacent to (e.g., immediately above) a display screen 504. According, in FIG. 5, a host device 104 includes both a wide-FOV capture device, such as a 360-degree camera, and a display screen 504, such as a display screen of a smartphone, tablet computer, laptop computer, or the like. Avatars of one or more client-side users 112 who are currently consuming the visual feed from the host capture device 505 are displayed on the display screen 504. Audio from one or more of the avatars may be output via speakers located near the display screen 504, attached to or incorporated into a display screen 504, and visual feedback (text chat, emoticons, emojis, etc.) may be rendered directly on the display screen 504. The display screen 504 may be combined with a computing device, e.g., a smartphone, a tablet computer, or a laptop computer, which may also be connected to the capture device 505, and have a network connection, allowing a host device to be completely self-contained. One potential drawback of this approach is that the display screen 504 is only visible from the front, preventing avatars from interacting with local participants at the host site 101, 401 who are not in front of the display 504. This potential drawback could be addressed by employing two, three, or four screens configured around the capture device. A second potential drawback of this approach is that the capture device 505 is not physically aligned with the display device, and as a result, the gaze direction of the avatars, if not appropriately modified, may not be an accurate indicator of at what point in the real scene users represented by the avatars are looking. Certain techniques discussed above can be used to adjust the representation of the remote users to provide a better indicator of where in the real scene remote users represented by avatars are actually looking.

Referring to FIG. 6, in accordance with certain embodiments, a host capture device 605 (e.g., camera) is located behind a display screen 604 along with a projection device 603, which can also be referred to as a projector 603. For example, the projector 603 can be a short-throw rear-projection display device, the display screen 604 can be a glass screen with holographic film, and the host capture device 605 can be a wide-FOV camera (e.g., the same or similar to 205 in FIG. 5) mounted only a few inches behind the screen 604. Rear projection provides certain benefits over standard projection as it avoids having the projector illuminate the camera directly. Further, use of an ultra-short-throw projector device allows the camera to be placed close to the screen 604. This approach can be used to improve the alignment of avatar gaze with the real-world scene. As with certain other embodiments described above, multiple screens could be deployed to enable the avatars to interact with local participants on all sides of the capture device 605. Curved screens may be used, with appropriate projection mapping.

Referring to FIG. 7, in accordance with certain embodiments, a host capture device 705 (e.g., a camera) is mounted behind a transparent display screen 704, which is also known as a see-through display. Such a transparent display screen 704 allows a viewer to see what is shown on the screen 704 while still being able to see through the screen 704. Similar technology has been used in AR HMDs and other AR devices. Beneficially, because the transparency of the display screen 704, the capture device 705 located on one side of the transparent display screen 704 can capture video of a user (e.g., host-side user) located on the other (i.e., opposite) side of the display screen 704. Such an embodiment has the advantage of allowing the host capture device 705 to be quite close to the display screen 704 without causing a shadow.

In accordance with certain embodiments, multiple host capture devices (e.g., 105, 405, 505, 605, and/or 705) are co-located at different locations throughout a host-site (e.g., 101 or 401), with each of the host capture devices having a different wide-FOV of the host site, and thus the audio-visual feed from each of the different host capture devices being different. For example, four separate host capture devices can be located adjacent to four different walls or corners at a host-site. Each client-side user that is using their client device to participate in an immersive teleconference can use their client device to select from which host capture device they want to receive an audio-visual feed, thus allowing the client-side user to change the perspective from which they are viewing the host-site. In certain embodiments, a respective display screen (e.g., 504, 604, or 704) is located adjacent to of each of the host capture devices to enable host-side users to view representations of client-side users (i.e., real-world bodies or avatars of client-side users) that are participating in the teleconference. Each representation of a client-side user (i.e., an image of the real-world body or an avatar of the client-side user) that is displayed on one of the display screens at the host-site will appear at an appropriate respective virtual location with an appropriate respective orientation (e.g., head pose). In certain such embodiments, whenever a client-side user changes which audio-visual feed they want to view, and thus changes from which host capture device they are receiving an audio-visual feed, the specific display screen on which the representation of the client-side user is displayed will also change. More specifically, a representation of the client-side user will appear on the display screen that is adjacent to the host capture device from which the client device of the client-side users is receiving the audio-visual feed. Thus, if a client-side user changes from observing the host site from the perspective of a first host capture device to from the perspective of a second host capture device, the visual representation of the client-side user will change from being displayed on a first display screen (adjacent the first host capture device) to being display on a second display screen (adjacent to the second host capture device). Accordingly, to a host-side user that observes that the visual representation of the client-side user changed from being displayed on the first display screen to being displayed on the second display screen, it will appear as if the client-side user moved from one side of the host-site to another side of the host-site. The client-side user will also appear at their virtual location and with their orientation on the display screen on which they appear. Accordingly in such an embodiment a client-side user can be considered to have a coarse virtual location, which corresponds to the specific display screen on which the client-side user's visual representation appears, and a fine virtual location, which corresponds to the location on the specific display screen that the visual representation of the client-side user appears.

In alternative embodiments, instead of having a respective display screen (e.g., 504, 604, or 704) located adjacent to of each of a plurality of host capture devices, each of the host-side users that are at the host site can have a respective AR device (e.g., an AR headset) that enables the host-side users to view visual representations of client-side users, e.g., as was discussed above with reference to FIG. 4A. In certain such embodiments, whenever a client-side users changes which audio-visual feed they want to view, and thus changes from which host capture device they are receiving an audio-visual feed, the virtual location of the client-side user (as viewed by a host-side user using their AR device) will change accordingly. Thus, if a client-side user changes from observing the host-site from the perspective of a first host capture device to from the perspective of a second host capture device, the visual representation of the client-side user being displayed by an AR device (to a host-side user) will change from being displayed at a first virtual location to a second virtual location, to give the appearance to the host-side user that the location of the client-side user has changed.

Where an audio-visual feed is produced by a client device, it can be referred to more specifically as a client audio-visual feed that includes audio data for the client-side user and visual representation data for the client-side user. The visual representation data can correspond to real-word video of the client-side user or an avatar representing the client-side user. Where an audio-visual feed is produced by a host device, it can be referred to more specifically as a host audio-visual feed that includes audio data from a host site and a video data for the host site, which video audio and data can include audio and video of one or more host-side users that are located at the host site. It is also noted that using embodiments of the present technology, it is possible for one or more client-side users to observe a host site, and representations of one another at the host site, even if a host-side user is not located at the host site, so long as there is a host device located at the host site. For an example, a host device can be set up in the middle of a room of a house that is being remodeled. A first client-side user that is an architect or an interior designer and a second client-side user that is the owner of the house can participate in a teleconference about the remodel, whereby the client-side users can see the room (which is the host site in this example) and representations of one another at the host site, and can communicate with one another about the remodel of the room, even though neither of them (nor any other person) is actually located at the host site.

The term "real-world body" was often used in the above description to distinguish between when an audio-visual feed of a client-side user includes actual image data of the client-side user (captured by a camera), as opposed to avatar image data for the client-side user (that is rendered by one or more processors). The term "real-world body" was also used to distinguish between when actual images/video of a client-side user is displayed to a host-side user and/or other client-side user, as opposed to an avatar of a client-side user being displayed to a host-side user and/or other client-side user. It is noted that the term "real-world body" is not meant to imply that an entire body of the client-side user is captured and viewable, although that indeed may be the case. Rather, a "real-world body" can, and often may, just include the head and face of the client-side user, and potentially also their neck and upper torso. The exact portion of a client-side user that is included in their real-world body representation will depend on many factors, including the relative location of a camera to the client-side user whose images are being captured by the camera, the focal length setting of the camera, etc.

Figure 8:
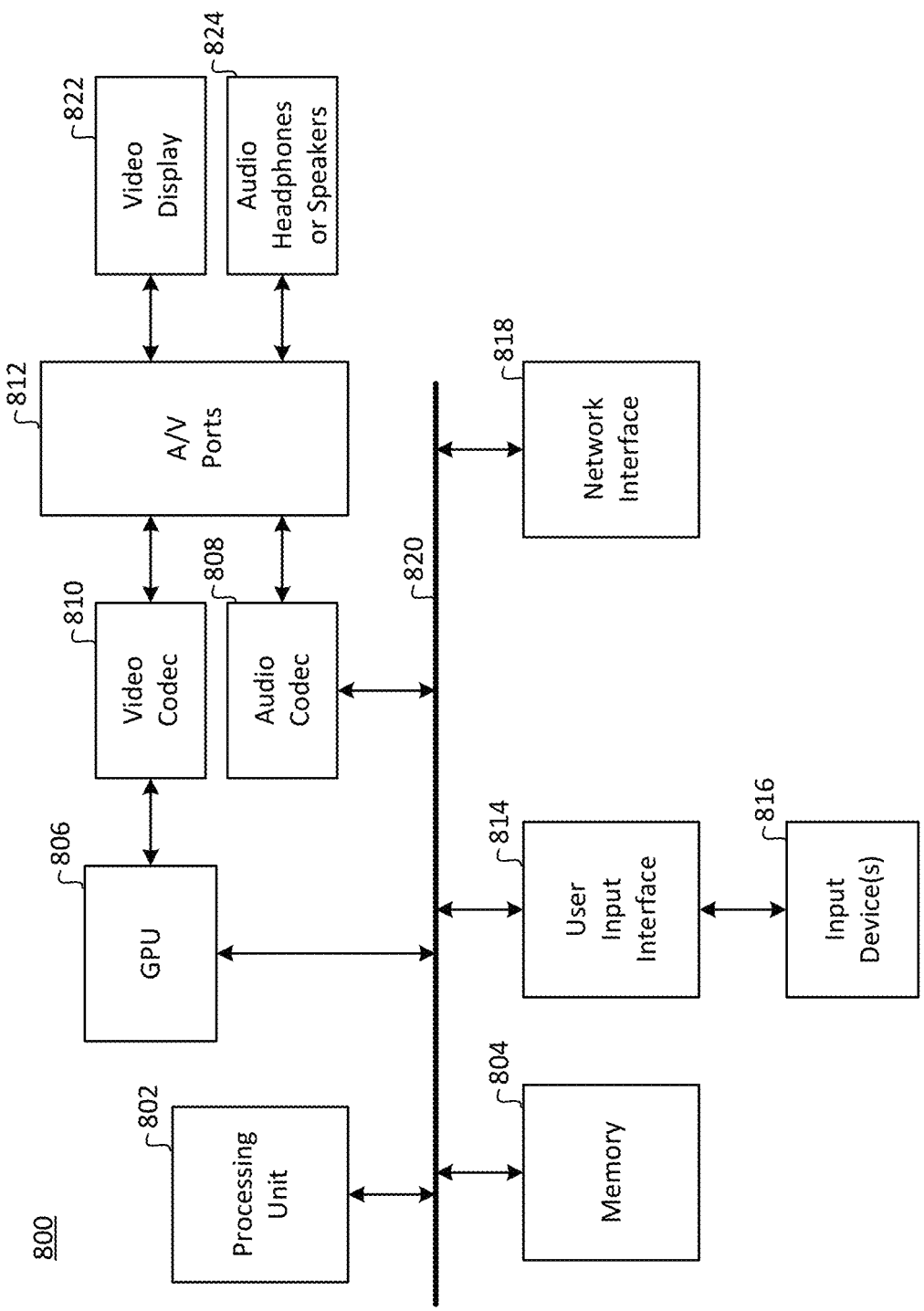
FIG. 8 is a high level schematic block diagram of an example computing device that can be used to implement a host device or a client device, or at least a portion thereof.

The host devices and client devices described above, or at least portions thereof, can be implemented using computing devices. An example of such a computing device is shown in and described with reference to FIG. 8. Referring to FIG. 8, the computing device 800 shown therein includes one or more processing units 802 (which can also be referred to processors), memory 804, a graphical processing unit (GPU) 806, an audio codec 808, a video codec 810, audio-video (AN) ports 812, a user input interface 814, input device(s) 816, a network interface 818 and a bus 820. The computing device 800 shown in FIG. 8 is only one example of a suitable computing device and is not intended to suggest any limitation as to the scope of use or functionality of the presently disclosed subject matter. Neither should the computing device 800 be interpreted as having any dependency or requirement relating to any one or combination of components illustrated in the example computing device 800. In some embodiments the various depicted computing elements may include circuitry configured to instantiate specific aspects of the present technology. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

The computing device 800 can includes a variety of computer readable media. Computer readable media can be any available media that can be accessed by the computing device 800 and includes both volatile and nonvolatile media, removable and non-removable media. Such computer readable media is generally represented by the memory 804, which can include volatile and/or nonvolatile memory such as read only memory (ROM) and random access memory (RAM). The memory 804 can store, e.g., a basic input/output system (BIOS), data and/or program modules that are immediately accessible the processing unit 802. The memory 804 can also store an operating system, application programs, other program modules, and program data. The computing device 800 can also include other removable/non-removable, volatile/nonvolatile computer storage media, such as, but not limited to, a hard disk drive, nonvolatile magnetic media, a magnetic disk drive, and an optical disk drive that reads from or writes to a removable, nonvolatile optical disk such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like.

A user may enter commands and information into the computing device 800 through input device(s) 816 such as a keyboard and/or a pointing device, such as a mouse, trackball or touch pad. Such command can be used, e.g., to control an avatar in a VR environment. Other example input devices include a microphone, joystick, or game pad. Where the computing device 800 comprises or is connected to an HMD, the HMD and/or sensors thereof can be input device(s) 816. These and other input devices can be connected to the processing unit(s) 802 through a user input interface 814 that is coupled to the bus 820, but may be connected by other interface and bus structures, such as a parallel port, game port or a universal serial bus (USB). It is also possible that an input device 816 includes one or more cameras (e.g., one or more wide-FOV cameras) and/or other capture devices that can recognize user motion and/or gestures using time-of-flight (TOF), LIDAR, structured light and/or other technologies. Examples of such input devices, which are commercially available, include the Kinect™ available from Microsoft Corporation (headquartered in Redmond, Wash., USA), the Play Station™ Camera available from Sony Corporation (headquartered in Tokyo, Japan) and the Senz3D™ available from Creative Technology Ltd (headquartered in Singapore), just to name a few. Where the computing device 800 is a smartphone, a camera on the smartphone can be used to capture a user's facial expressions and facial gestures, a user's head pose, a user's head gestures (such as nodding one's head up and down, or rotating one's head left and right), and the like. In other words, a smartphone camera can be an input device 816. An input device 816 can also include one or more motion sensors, such as, but not limited to a gyroscope, an accelerometer and/or a magnetometer. An input device 816 can also include optical sensor technology. These are just a few examples of the type of input devices 816 that can be used to accept, capture or obtain inputs from users, which are not intended to be all encompassing.

A monitor or other type of display device 822 can be connected to the video codec 810 via audio-video (A/V) ports 812 or some other video interface. Headphones, speakers or some other audio output device 824 can be connected to the audio codec 808 via the A/V ports 812 or some other audio interface. In specific embodiments, in order to enable a user to experience spatialized sound, the audio output device 824 provides for stereo sound, and more specifically, at least two-channel (e.g., left and right) audio, and potentially more than two-channel audio. Where the computing device 800 comprises or is connected to an HMD, the display device 822 can be part of the HMD, as can the headphones, speakers or some other audio output device 824, as can other components that are shown in FIG. 8.

Figure 9:
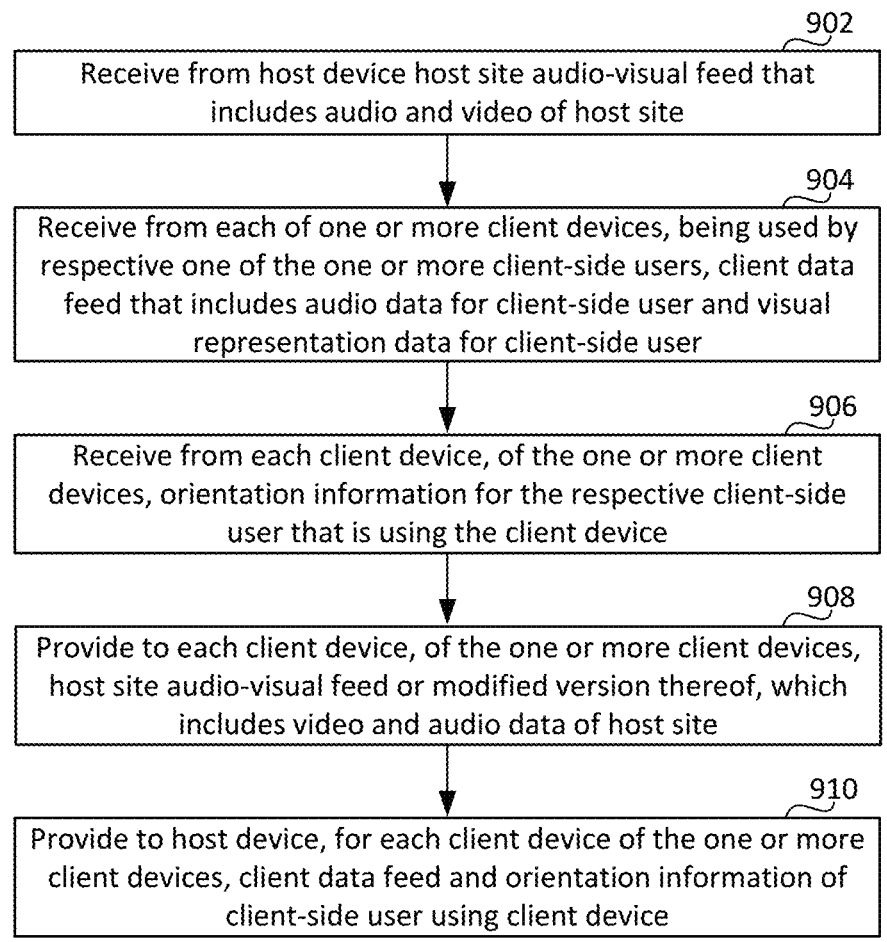
FIG. 9 is a high level flow diagram used to described various methods of the present technology for enabling a teleconference among one or more host-side users located at a host site and one or more client-side users that are remotely located relative to the host site.

The high level flow diagram in FIG. 9 will now be used to described various methods of the present technology for enabling a teleconference among one or more host-side users located at a host site and one or more client-side users that are remotely located relative to the host site, wherein a host device is located at the host site, and wherein each of the one or more client-side users uses a respective client device to participate in the teleconference. Such methods can be performed, e.g., by one or more communication server(s) 114. Such communication server(s) 114 can be located at the host site, and can even be implemented by a host device located at the host site. Alternatively, such communication server(s) 114 can be located remote from the host site, e.g., at a data center or server farm, or the like, wherein such communication server(s) communicate with the host device and the client device(s).

Referring to FIG. 9, step 902 involves receiving from the host device a host site audio-visual feed that includes audio and video of the host site. Where the host site includes one or more host-side users, the audio and video of the host site can also include audio and video of the host-side user(s), as well as the environment (e.g., room) within which the host-side user(s) is/are located, which environment can be considered the host site.

Step 904 involves receiving from each of one or more client devices, being used by a respective one of the one or more client-side users, a client data feed that includes audio data for the client-side user and visual representation data for the client-side user. Depending upon the specific client device being used by a client-side users, the visual representation data can correspond to real-world images or real-world video of the client-side user, e.g., if the client device is a smartphone or tablet computer having a front facing camera, or if the client device is a laptop or desktop computer having a webcam. Where the client device is an HMD, the visual representation data can include data that defines a client-side user's avatar as well as motion data (e.g., including head, hand, and/or body motion data) sufficient to animate an avatar representing the client-side user.

Step 906 involves receiving from each client device, of the one or more client devices, orientation information for the respective client-side user that is using the client device. Such orientation information can include viewport orientation data which specifies a portion of a video feed that a client-side user is consuming using their client device, and more specifically, can specify a head pose of a client-side user that is wearing an HMD, or can specify a viewport of a client that responds to inputs to a user interface to performing panning and/or tilting.

Steps 906 and 904 can be combined into a single step, and more generally, steps 902-906 need not be performed in the order shown, e.g., step 904 can occur prior to step 902 or simultaneous with step 902. Preferably, steps 902, 904, and 906 would occur at substantially the same time, i.e., substantially simultaneously.

Step 908 involves providing to each client device, of the one or more client devices, the host site audio-visual feed or a modified version thereof, which includes video and audio data of the host site (and any host-side users located at the host site, if present), to thereby enable each client device to output video and audio of the host site for consumption by a respective client-side user that is using the client device.

Step 910 involves providing to the host device, for each client device of the one or more client devices, the client data feed and the orientation information of the client-side user that is using the client device, to thereby enable the host device to display, to the one or more host-side users located at the host site, a visual representation of each of the one or more client-side users with their respective orientation. As alluded to above, the visual representation of each client-side user, of the one or more client-side users, can include one or more real-word images of the client-side user, real-world video of the client-side user, or an avatar representing the client-side user.

Steps 908 and 910 can be performed in a different order than shown, e.g., step 910 can occur prior to step 908. Preferably, steps 908 and 910 would occur at substantially the same time, i.e., substantially simultaneously.

Presume for example that a first client-side user is using an HMD type of client device, and a second client-side user is using a webcam or other type of camera able to capture real-world video. The visual representation data, which is received from the HMD type client device of the first client-side user, can correspond to motion data sufficient to animate an avatar representing the first client-side user. In such a case, the client data feed and the orientation information for the first client-side user, which is provided to the host device, enables the host device to display the avatar representing the first client-side user in a manner that indicates an orientation with which the first client-side user is consuming video of the host site using the client device of the first client-side user. With respect to the second client-side user, the visual representation data, which is received from the client device of the second client-side user, can correspond to real-world video of the second client-side user. In such a case, the client data feed and the orientation information of the second client-side user, which is provided to the host device, enables the host device to display the real-world video of the second client-side user in a manner that indicates an orientation with which the second client-side user is consuming video of the host site using the client device of the second client-side user.

Where a client-side user is using an HMD type of client device, in response to orientation information from the HMD type of client device indicating that a client-side user has changed their head pose, there can be a change in how an orientation of a representation of the client-side user is displayed on the host device and on client devices of other client-side users. Where a client-side user is using a non-HMD type of client device, in response to orientation information from the client device indicating that the client-side user has changed their viewport by performing panning and/or tilting, there can be a corresponding change to how an orientation of a representation of the client-side user is displayed on the host device and on a client device of another client-side user.

Where a plurality of client-side users are participating in the teleconference, a respective client data feed and respective orientation information is received from each of the client devices for a respective one of the plurality of client-side users. In such a case, each client device, of the plurality of client devices being used by the plurality of client-side users, is provided with one or more client data feeds and respective orientation information that enables the client device to display a visual representation of the other ones of the client-side users at their respective virtual locations at the host site.

For an example, a first client data feed and respective orientation information for a first client-side user, and a second client data feed and respective orientation information for a second client-side user, can be provided to a client device of a third client-side user. In such a case, the first client data feed can include visual representation data that corresponds to motion data sufficient to animate an avatar representing the first client-side user on the client device of the third client-side user in a manner that indicates an orientation with which the first client-side user is consuming video of the host site using the client device of the first client-side user. The second client data feed can correspond to real-world video of the second client-side user that enables real-world video of the second client-side user to be displayed on the client device of the third client-side user in a manner that indicates an orientation with which the second client-side user is consuming video of the host site using the client device of the second client-side user. More specifically, the first and second client data feeds that are provided to the client device of the third client-side user may enable the avatar representing the first client-side and the real-world video of the second client-side user to be simultaneously displayed on the client device of the third client-side user, such that the avatar representing the first client-side and the real-world video of the second client-side user appear as if they are located at the host site. The orientation information corresponding to the first client data feed can be used to control where the avatar representing the first client-side appears to be looking. The orientation information corresponding to the second client data feed can be used to control where the real-world video of the second client-side user appears to be looking. An example of this is shown in FIG. 4B, which was described above.

As was already mentioned above, a host device can determine or otherwise obtain, for each of a plurality of client-side users, virtual location information for the client-side user. Based on this information, when the host device displays visual representations of each of the client-side users to a host-side user located at the host site, on a non-AR display or on an AR display, such as an AR HMD, the visual representations of the client-side users are displayed at their respective virtual locations. As was also mentioned above, the host device can determine the virtual location information of the client-side users by assigning each client-side user their respective virtual location. Alternatively, client-side users can user their client devices to select their virtual locations, and the client devices can provide to the host device, the virtual location information for the client-side users that are using the client devices. In another example, a host device can initially assign a virtual location to each client-side user, but the client-side user can be given the option of changing their virtual location using a user input of their client device. In such embodiments, there can be a change to the visual representations of client-side users being displayed in response to the virtual locations of the client-side users changing. The host site audio-visual feed received at step 902 can be obtained by a wide-FOV camera (e.g., a 360-degree camera) of a host device that produces wide-FOV video. However, different portions of the host site can be viewed by each client-side user, of a plurality of client-side users, in response to the client-side users adjusting their orientations, and more specifically, their viewports.

In certain embodiments of the present technology, the virtual locations of client-side users are not mapped to real-world locations at the host site. In other embodiments of the present technology, in which a 3D model of the host site is produced, the virtual locations of client-side users are mapped to real-world locations at the host site. Further details of such embodiments are described below with reference to the high level flow diagram of FIG. 10.

Figure 10:
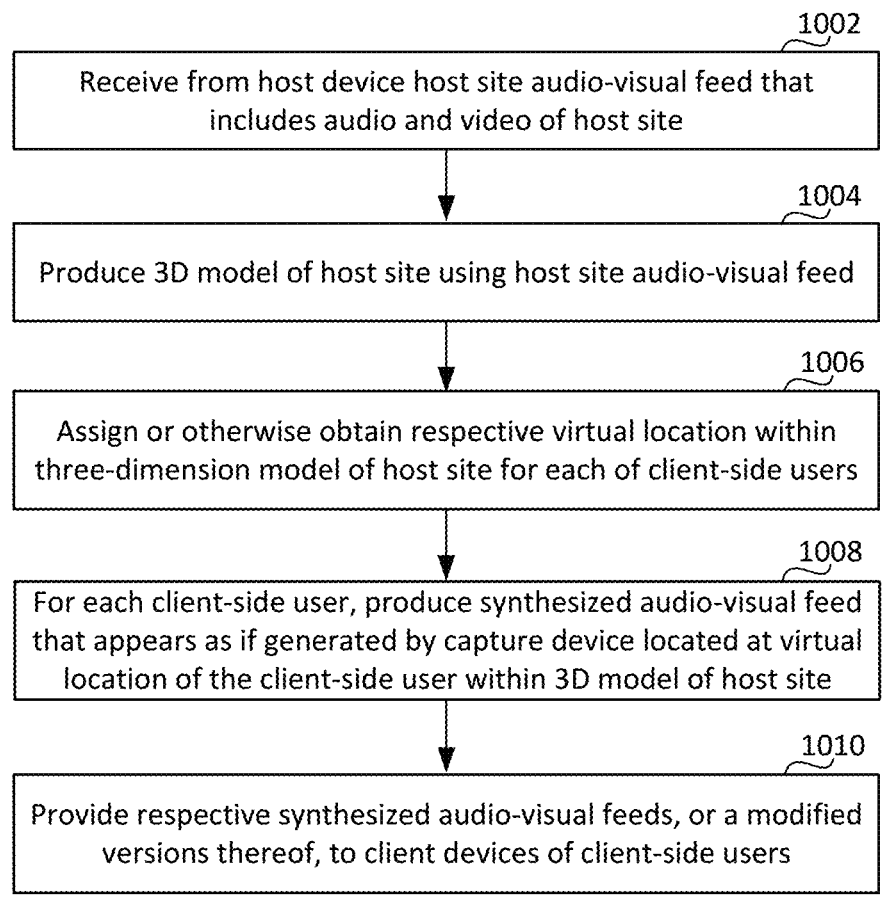
FIG. 10 is a high level flow diagram used to described various methods of the present technology that map client-side users to real-world locations within a 3D model of a host site.

Referring to FIG. 10, step 1002 involves receiving from the host device a host site audio-visual feed that includes audio and video of the host site. Where the host site includes one or more host-side users, the audio and video of the host site can also include audio and video of the host-side user(s), as well as the environment (e.g., room) within which the host-side user(s) are located, which environment can be considered the host site. Step 1002 is the same as step 902, and if step 902 is already performed need not be repeated.

Step 1004 involves producing a 3D model of the host site using the host site audio-visual feed. As was already described above, such a 3D model may be generated using, e.g., Simultaneous Localization and Mapping (SLAM) or Structure from Motion (SfM) techniques, but are not limited thereto. Commercially-available systems, such as ARKit, ARCore, or Vuforia, or a custom solution, can be used to generate the 3D model. The 3D model is generated in such a manner that each virtual location in the 3D model is mapped to an actual real-world location within the host-site. As noted above, different spatial models generated by different devices or techniques may be fused using a variety of techniques including the analysis and comparison of registration points in the visual data from the various sources.

Step 1006 involves assigning or otherwise obtaining for each of the client-side users a respective virtual location within the 3D model of the host site. Since each virtual location in the 3D model is mapped to a real-world location in the host site, step 1006 results in mapping each client-side user to a real-world location at the host site.

Step 1008 involves producing, for each of the client-side users, a synthesized audio-visual feed that appears as if it were generated by a capture device located at the virtual location of the client-side user within the 3D model of the host site. In other words, each synthesized audio-visual feed for a specific client-side user can appear as if it were generated by a virtual camera located at the virtual location of the client-side user with the 3D model of the host site. Such synthesized audio-visual feeds can be produced by virtual camera rendering engines. As a client-side user uses their client device to move about the 3D model of the host site, e.g., from a first virtual location to a second virtual location, the synthesized audio-visual feed is changed accordingly, e.g., to change from appearing as if it were generated by a capture device located at the first virtual location to appearing as if it were generated by a capture device located at the second virtual location.

Still referring to FIG. 10, step 1010 involves providing respective synthesized audio-visual feeds, or a modified versions thereof, to the client devices of the client-side users to thereby enable consumption of the synthesized audio-visual feeds by the client-side user. More specifically, an entire and unmodified synthesized audio-visual feed that is produced for a client-side user (e.g., by a host device and/or communication server(s)) can be sent to the client device of the client-side user. Alternatively, the synthesized audio-visual feed (before being sent to the client device of a client-side user) can be modified to reduce the amount of data that is actually transmitted, using one of the techniques described above. For example, based on the orientation information for a client-side user, a modified version of the synthesized audio-visual feed produced for that client-side user can include less than the entire wide-FOV visual data for the host site and/or can emphasize the visual portion of the audio-visual feed being viewed on the client-side device of the client-side user at any given time.

Where a host-side user is using an AR device to participate in the teleconference, a visual representation the client-side users at their respective virtual locations within the 3D model of the host site and with their respective orientations can be displayed to the host-side user on their AR device.

Figure 11:
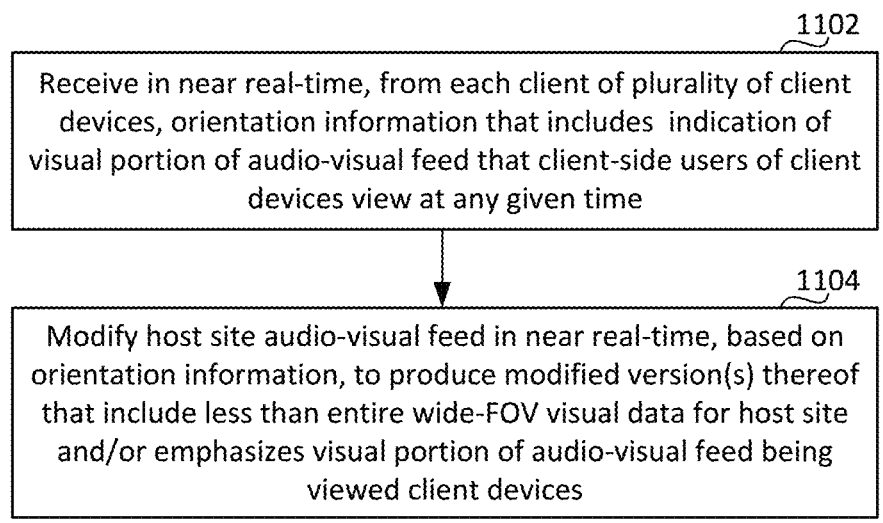
FIG. 11 is a high level flow diagram used to described various methods of the present technology that reduces an amount of data sent to client devices to reduce latency.

As explained above, and described in more detail below with reference to FIG. 11, in order to reduce the amount of data sent to client devices, e.g., to reduce latency, a full wide-FOV video feed may not be provided to each client device of each client-side user. Referring to FIG. 11, step 1102 involves receiving in near real-time, from each client device, of a plurality of client devices, orientation information that includes an indication of a visual portion of the audio-visual feed that a client-side user of the client device is viewing at any given time, which is less than the entire wide-FOV of the host site. The term "near real-time" as used herein refers to the time required for data processing by at least one of two devices that are communicating with one another, and for data transmission between the two devices. This implies that there are no significant delays. This time should have a low enough latency to enable conversation between client-side users and host side users. At the upper end, this time can be 1.5 seconds, but is preferably less than 0.5 seconds, and is more preferably less than 0.1 seconds.

Still referring to FIG. 11, step 1104 involves modifying the host site audio-visual feed in near real-time, based on the orientation information, to produce one or more modified versions thereof that include less than the entire wide-FOV visual data for the host site and/or emphasizes the visual portion of the audio-visual feed being viewed on the one or more client devices at any given time, to thereby reduce an amount of data that is provided to each client device, of the one or more client devices. For an example, portions of video frames that are not being viewed can be removed from an audio-visual feed. Alternatively, or additionally, an asymmetric projection can be used to devote a larger area in the encoded video frames to a specific portion of the video frames that are within client-side users' viewports. Other variations are also possible and within the scope of the embodiments described herein.

In accordance with certain embodiments, at step 1102, or a separate step, respective orientation information is received in near real-time from each of a plurality of client devices, each of which is being used by a respective client-side user. In such an embodiment, an aggregate attention area can be determined based on the orientation information received in near real-time from the plurality of client devices. In such an embodiment, the modifying performed at step 1104 can be performed based on the aggregate attention area to thereby produce a modified version of the host site audio-visual feed that is provided to the plurality of client devices. More specifically, the modified version can primarily include the portion of the audio-visual feed that corresponds to the aggregate attention area. Alternatively, or additionally, the modified version can emphasize the visual portion of the audio-visual feed that corresponds to the aggregate attention area. In other embodiments, the modifying that is performed at step 1104 is performed separately for each of the plurality of client devices to thereby produce a separate modified version of the host site audio-visual feed for each of the plurality of client devices.

Teleconferences supported by embodiments of the present technology described herein can be considered telepresence conferences since client-side users are provided with a feeling as if they are present at the host site, and host site users are provided with a feeling as if client-side users are located with them at the host site.

In accordance with certain embodiments, the features and functions described herein, or subsets thereof, can be performed under the control of mobile applications that are downloaded to, stored on, and executed by one or more mobile computing device type host devices and client devices. For example, where host device(s) and/or client device(s) are mobile computing devices, such as a smartphone or tablet computing device, various features described herein can be performed under the control of a mobile application, which is also known as a mobile app, or simply an app. Such a mobile application can be available for download from an application store or directly from a software vender, for free, or for a fee. In accordance with certain embodiments of the present technology, the mobile application controls aspects of both the mobile computing device and the capture device thereof or communicatively coupled thereto (e.g., via a wireless or wired communication link). Similar applications can be downloaded to other types of computing devices such as laptop and desktop computers, and/or the like. It is also possible that host devices and/or client devices be sold with software for implementing the features and functions described herein already preloaded on the devices. Other variations are also possible and within the scope of the embodiments described herein.

Embodiments of the present technology offer new alternatives to business travel by allowing people to share or visit a real place, in near real-time, in 360-degrees, without having to be there. Such embodiments can utilize an inexpensive mobile 360-degree camera (or other wide-FOV camera) to allow a host user to share a live 360-degree view (or other wide-FOV) of a host site, where the host is located. Multiple users can join from anywhere using a VR headset, mobile device, desktop, or other computing device. In certain embodiments, the host user can use a mobile computer device (e.g., smart phone) and a 360-degree camera (or other wide-FOV camera) to walk around to share a host site with remote users. Embodiments of the present technology can enable users that are geographically dispersed to work together to solve problems quickly, monitor progress, ensure approvals, get experts virtually onsite, inspect from anywhere, and the like. As one example, the host user can be a realtor in one city that performs a walkthrough of a property (e.g., a housing unit in San Francisco), and the remote user can be a client that is located in another city (e.g., New York City). The remote user can observe the walkthrough and basically see everything that the host user is seeing, and can speak and otherwise interact with the host user in near real-time. As another example, a general contractor for a housing development being built in one state (e.g., Florida) can perform a walkthrough for a remote user that is an architect based in another state (e.g., California). When performing such walkthroughs, the host can use a selfie stick to hold a smartphone to which is attached a 360-degree camera, which can collectively be considered the host device. The smartphone can optionally also be physically or wirelessly coupled to an audio headset. The remote user (aka client-side user) can maneuver their client device (e.g., HMD, or smart phone) to determine what they want to look at during the walkthrough, e.g., look at portions of a property being walked through, or look at the host user while conversing with the host user. For still another example, a host site can be a site of a wedding, and a client-side user that wishes to feel as if they are at the host site can be a relative or friend of the bride or groom, wherein the relative or friend is unable to attend the wedding. These are just a few examples of how embodiments of the present technology may be used, which examples are not intended to be all encompassing. Industries that can benefit from embodiments of the present technology include, but are not limited to, real estate, construction, insurance, hospitality, retail, engineering, recruiting, medical, manufacturing, facilities management, legal, etc. Such embodiments can beneficially save time and money by providing an alternative to business travel, as well as other types of travel. Further, embodiments of the present technology can bypass travel restrictions that may occur due to viruses and/or government policies. Further, embodiments of the present technology, by reducing travel, can help reduce individuals' and companies' carbon footprints.

Embodiments of the present technology have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed invention. For example, it would be possible to combine or separate some of the steps described above.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage.

A computer program may be stored or distributed on a suitable medium, such as an optical storage medium or a solid-state medium supplied together with, or as part of, other hardware, but may also be distributed in other forms, such as via the Internet or other wired or wireless telecommunication systems.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the above detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Computer-readable storage media (medium) exclude (excludes) propagated signals per se, can be accessed by a computer and/or processor(s), and include volatile and non-volatile internal and/or external media that is removable and/or non-removable. For the computer, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

The previous description of the preferred embodiments is provided to enable any person skilled in the art to make or use the embodiments of the present invention. While the invention has been particularly shown and described with reference to preferred embodiments thereof, it will be understood by those skilled in the art that various changes in form and details may be made therein without departing from the spirit and scope of the invention.

What is claimed is:

1. A method for enabling a teleconference among one or more host-side users located at a host site and one or more client-side users that are remotely located relative to the host site, wherein a host device is located at the host site, and wherein each of the one or more client-side users uses a respective client device of one or more client devices to participate in the teleconference, the method comprising:
   receiving from the host device a host site audio-visual feed that includes audio and video of the host site, captured from the host site by the host device;
   providing to each client device, of the one or more client devices being used by the one or more client-side users, the host site audio-visual feed, or a modified version thereof, which includes video and audio data of the host site, to thereby enable each client device to output video and audio of the host site for consumption by a respective client-side user that is using the client device;
   receiving from each of the one or more client devices, being used by a respective one of the one or more client-side users, a client data feed that includes audio data for the client-side user and visual representation data for the client-side user, wherein the visual representation data corresponds to real-world images of the client-side user, real-world video of the client-side user, or motion data derived from physical motion of the client-side user sufficient to animate an avatar representing the client-side user;
   receiving from at least one of the one or more client devices, being used by a respective one of the one or more client-side users, orientation information that includes an indication of a visual portion of the host site audio-visual feed or the modified version thereof that a client-side user of the client device is viewing at any given time, which corresponds to less than a full field of view (FOV) captured from the host site by the host device;
   providing to the host device, for each client device of the one or more client devices, the client data feed and the orientation information of the client-side user that is using the client device, to thereby enable the host device to display, to the one or more host-side users located at the host site, a visual representation of each of the one or more client-side users with their respective orientation, wherein the visual representation of each client-side user, of the one or more client-side users, comprises one or more real-word images of the client-side user, real-world video of the client-side user, or an avatar representing the client-side user; and causing displaying on a host display device located at the host site, a respective said visual representation of each of the one or more client-side users with their respective orientation, which provides an indication of the visual portion of the host site audio-visual feed or the modified version thereof that the client-side user is viewing at any given time, wherein the host display device is part of the host device or is communicatively coupled to the host device.

2. The method of claim 1, wherein the one or more client-side users comprises a plurality of client-side users, including first and second client-side users, each of which uses a respective client device of a plurality of client devices to participate in the teleconference.

3. The method of claim 2, wherein when the respective orientation for the first and second client-side users indicates that the first and second client-side users are looking at visual representations of one another at the host site, the visual representations of the first and second client-side users will be displayed on the host display device in a manner that will appear, to a said host-side user observing the host display device, as if the visual representations of the first and second client-side users are looking at one another.

4. The method of claim 2, wherein when the respective orientation for the first and second client-side users indicates that the first and second client-side users are both looking at a visual portion of the host site audio-visual feed representing a said host-side user located at the host site, the visual representations of the first and second client-side users will be displayed on the host display device in a manner that will appear, to the said host-side user observing the host display device, as if the visual representations of the first and second client-side users are both looking at the said host-side user.

5. The method of claim 2, wherein:
the client data feed for the first client-side user includes real-world video of the first client-side user; and
further comprising causing displaying, on the client device that is being used by the second client-side user, the real-world video of the first client-side user such that the real-world video is shown in a floating screen that appears as if the floating screen is located at the host site.

6. The method of claim 5, wherein in response to the first client-side user performing panning and/or tilting to change their orientation, a visual indication thereof is provided to the second client-side user.

7. The method of claim 2, wherein the client data feed for the second client-side user includes motion data sufficient to animate an avatar representing the second client-side user, and further comprising:
causing displaying, on the client device that is being used by the first client-side user, the avatar representing the second client-side user such that where the avatar representing the second client-side user appears to be looking, and the indication of the visual portion of the host site audio-visual feed or the modified version thereof that the second client-side user is viewing, change in response to changes to the orientation information of the second client-side user that is using the second client device.

8. The method of claim 7, wherein the causing displaying on the host display device located at the host site comprises causing the real-world video of the first client-side user, and the avatar representing the second client-side user, to both be displayed on the host display device located at the host site.

9. The method of claim 1, wherein the host display device comprises an augmented reality (AR) device being used by a said host-side user, and wherein the causing displaying comprises causing displaying of a visual representation of a said client-side user at a respective virtual location at the host site and with the respective orientation of the client-side user, which provides the indication of the visual portion of the host site audio-visual feed or the modified version thereof that the client-side user is viewing at any given time.

10. The method of claim 9, wherein the virtual location of the visual representation of the said client side user, as displayed to the said host-side user via augmented reality, corresponds to a physical location of the host device from which the host-site audio-visual feed is derived.

11. The method of claim 9, wherein the virtual location of the visual representation of the said client side user, as displayed to the said host-side user, corresponds to a location of a virtual camera within a three-dimension (3D) model of the host site.

12. The method of claim 11, further comprising a virtual camera rendering engine, associated with the virtual camera within the 3D model of the host site, generating a synthesized audio-visual feed that can be consumed by the said client-side user.

13. The method of claim 11, wherein when the virtual location of the said client-side user changes, the visual representation of the said client-side user displayed on the host display device changes, such that when the said client-side user moves from a first virtual location to a second virtual location at the host site, the visual representation of the said client-side user that is displayed on the host display device changes from being at the first virtual location to being at the second virtual location.

14. A system for enabling a teleconference among one or more host-side users located at a host site and one or more client-side users that are remotely located relative to the host site, wherein a host device is located at the host site, and wherein each of the one or more client-side users uses a respective client device of one or more client devices to participate in the teleconference, the system comprising one or more processor configured to:
receive from the host device a host site audio-visual feed that includes audio and video of the host site, captured from the host site by the host device;
provide to each client device, of the one or more client devices, the host site audio-visual feed, or a modified version thereof, which includes video and audio data of the host site, to thereby enable each client device to output video and audio of the host site for consumption by a respective client-side user that is using the client device;
receive from each of the one or more client devices, being used by a respective one of the one or more client-side users, a client data feed that includes audio data for the client-side user and visual representation data for the client-side user, wherein the visual representation data corresponds to real-world images of the client-side user, real-world video of the client-side user, or motion data derived from physical motion of the client-side user sufficient to animate an avatar representing the client-side user;

receive from at least one of the one or more client devices, being used by a respective one of the one or more client-side users, orientation information that includes an indication of a visual portion of the host site audio-visual feed or the modified version thereof that a client-side user of the client device is viewing at any given time, which corresponds to less than a full field of view (FOV) captured from the host site by the host device;

provide to the a host device, for each client device of the one or more client devices, the client data feed and the orientation information of the client-side user that is using the client device, to thereby enable the host device to display, to the one or more host-side users located at the host site, a visual representation of each of the one or more client-side users with their respective orientation, wherein the visual representation of each client-side user, of the one or more client-side users, comprises one or more real-word images of the client-side user, real-world video of the client-side user, or an avatar representing the client-side user; and cause displaying on a host display device located at the host site, a respective said visual representation of each of the one or more client-side users with their respective orientation, which provides an indication of the visual portion of the host site audio-visual feed or the modified version thereof that the client-side user is viewing at any given time, wherein the host display device is part of the host device or is communicatively coupled to the host device.

15. The system of claim 14, wherein the host display device comprises an augmented reality (AR) device being used by a said host-side user, and wherein a visual representation of a said client-side user at a respective virtual location at the host site and with the respective orientation of the client-side user is displayed on the AR device.

16. The system of claim 15, wherein the virtual location of the visual representation of the said client side user, as displayed to the said host-side user via augmented reality, corresponds to the physical location of the host device from which the host-site audio-visual feed is derived.

17. The system of claim 15, wherein the virtual location of the visual representation of the said client side user, as displayed to the said host-side user, corresponds to a location of a virtual camera within a three-dimension (3D) model of the host site.

18. The system of claim 17, further comprising a virtual camera rendering engine, associated with the virtual camera within the 3D model of the host site, the virtual camera rendering engine configured to generate a synthesized audio-visual feed that can be consumed by the said client-side user.

19. The system of claim 18, wherein the one or more processors are configured such that when the said client-side user moves from a first virtual location to a second virtual location at the host site, the visual representation of the said client-side user that is displayed on the host display device changes from being at the first virtual location to being at the second virtual location.

20. One or more processor readable storage devices having instructions encoded thereon which when executed cause one or more processors to perform a method for enabling a teleconference among one or more host-side users located at a host site and one or more client-side users that are remotely located relative to the host site, wherein a host device is located at the host site, and wherein each of the one or more client-side users uses a respective client device of one or more client devices to participate in the teleconference, the method comprising:

receiving from the host device a host site audio-visual feed that includes audio and video of the host site, captured from the host site by the host device;

providing to each client device, of the one or more client devices, the host site audio-visual feed, or a modified version thereof, which includes video and audio data of the host site, to thereby enable each client device to output video and audio of the host site for consumption by a respective client-side user that is using the client device;

receiving from each of the one or more client devices, being used by a respective one of the one or more client-side users, a client data feed that includes audio data for the client-side user and visual representation data for the client-side user, wherein the visual representation data corresponds to real-world images of the client-side user, real-world video of the client-side user, or motion data derived from physical motion of the client-side user sufficient to animate an avatar representing the client-side user;

receiving from at least one of the one or more client devices, being used by a respective one of the one or more client-side users, orientation information that includes an indication of a visual portion of the host site audio-visual feed or the modified version thereof that a client-side user of the client device is viewing at any given time, which corresponds to less than a full field of view (FOV) captured from the host site by the host device;

providing to the a host device, for each client device of the one or more client devices, the client data feed and the orientation information of the client-side user that is using the client device, to thereby enable the host device to display, to the one or more host-side users located at the host site, a visual representation of each of the one or more client-side users with their respective orientation, wherein the visual representation of each client-side user, of the one or more client-side users, comprises one or more real-word images of the client-side user, real-world video of the client-side user, or an avatar representing the client-side user; and causing displaying on a host display device located at the host site, a respective said visual representation of each of the one or more client-side users with their respective orientation, which provides an indication of the visual portion of the host site audio-visual feed or the modified version thereof that the client-side user is viewing at any given time, wherein the host display device is part of the host device or is communicatively coupled to the host device.

* * * * *